US012694141B2

(12) United States Patent
Shaw et al.

(10) Patent No.: US 12,694,141 B2
(45) Date of Patent: Jul. 28, 2026

(54) COMPUTING DEVICE, METHOD AND SYSTEM FOR CONTROLLING THE ACCESSIBILITY OF DATA

(71) Applicant: EXACTTRAK LIMITED, Warmington (GB)

(72) Inventors: Norman Shaw, Warmington (GB); John Pragnell, Warmington (GB)

(73) Assignee: EXACTTRAK LIMITED (GB)

( * ) Notice: Subject to any disclaimer, the term of this patent is extended or adjusted under 35 U.S.C. 154(b) by 978 days.

(21) Appl. No.: 17/599,364

(22) PCT Filed: Mar. 23, 2020

(86) PCT No.: PCT/GB2020/050778
§ 371 (c)(1),
(2) Date: Sep. 28, 2021

(87) PCT Pub. No.: WO2020/193965
PCT Pub. Date: Oct. 1, 2020

(65) Prior Publication Data
US 2022/0188443 A1 Jun. 16, 2022

(30) Foreign Application Priority Data

Mar. 28, 2019 (GB) ...................................... 1904311
Sep. 25, 2019 (GB) ...................................... 1913837

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *H04L 9/3213* (2013.01); *H04W 12/63* (2021.01)

(58) Field of Classification Search
CPC .. G06F 21/6218; G06F 21/602; H04W 12/63; H04L 9/3213
See application file for complete search history.

(56) References Cited

U.S. PATENT DOCUMENTS 8,646,060 B1 * 2/2014 Ben Ayed ............... H04W 4/20
726/9
9,351,098 B2 * 5/2016 Rivera .................. H04L 63/061
(Continued)

FOREIGN PATENT DOCUMENTS

EP 2074546 A1 7/2009
WO 2008/043090 A1 4/2008
(Continued)

*Primary Examiner* — Shanto Abedin
(74) *Attorney, Agent, or Firm* — HONIGMAN LLP; Eric J. Sosenko; Jonathan P. O'Brien

(57) ABSTRACT

A computing device for controlling the accessibility of data is described herein. A first network interface is configured to communicate via a first network, and a second network interface is configured to communicate via a second network. A processor is coupled to the first and second network interfaces. The processor is configured to make a determination about whether to provide access to data in response to receiving a first token via the first network, and a second token via the second network. The determination about whether to provide access to data is based on a comparison of the first token and the second token.

16 Claims, 13 Drawing Sheets

Figure 1A:
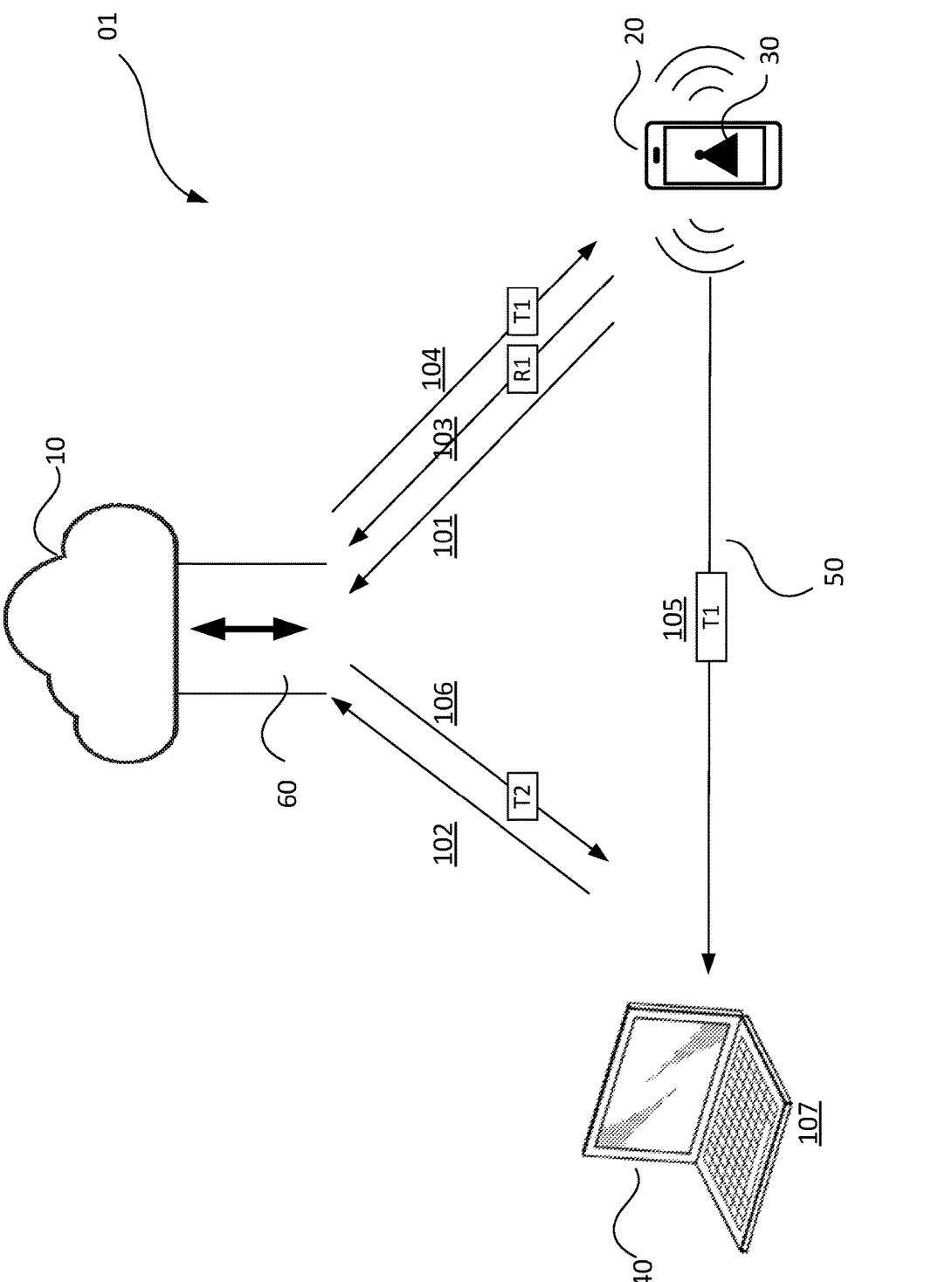

(51) Int. Cl.

| | | |
|---|---|---|
| *H04L 9/32* | (2006.01) | |
| *H04W 12/63* | (2021.01) | |

(56) References Cited

U.S. PATENT DOCUMENTS

| | | | |
|---|---|---|---|
| 10,063,592 B1 * | 8/2018 | McClintock | H04L 63/20 |
| 10,129,299 B1 * | 11/2018 | McClintock | H04L 63/0869 |
| 10,216,366 B2 * | 2/2019 | Ullrich | G16H 10/60 |
| 10,587,595 B1 * | 3/2020 | Naef | H04L 9/006 |
| 10,742,649 B1 * | 8/2020 | Hook, Jr. | H04L 63/0272 |
| 10,783,728 B1 * | 9/2020 | Mhaske | G07C 9/29 |
| 12,100,025 B2 * | 9/2024 | Blaikie, III | G06Q 30/0271 |
| 2013/0268997 A1 * | 10/2013 | Clancy, III | H04L 63/0227 |
| | | | 726/1 |
| 2015/0295901 A1 | 10/2015 | Woodward et al. | |
| 2015/0334115 A1 | 11/2015 | Jenne | |
| 2015/0334511 A1 | 11/2015 | Rivera et al. | |
| 2016/0037333 A1 | 2/2016 | Amundsen et al. | |
| 2016/0142443 A1 * | 5/2016 | Ting | H04L 63/20 |
| | | | 726/1 |
| 2016/0234221 A1 * | 8/2016 | Junuzovic | H04L 63/102 |
| 2016/0242143 A1 * | 8/2016 | Lotter | H04W 12/08 |
| 2016/0292444 A1 | 10/2016 | Shaw et al. | |
| 2018/0109936 A1 * | 4/2018 | Ting | H04W 4/029 |
| 2019/0007574 A1 * | 1/2019 | Takarabe | H04W 52/0251 |
| 2019/0116173 A1 * | 4/2019 | Robison | H04W 12/06 |
| 2019/0182749 A1 * | 6/2019 | Breaux | H04W 4/027 |
| 2020/0028684 A1 * | 1/2020 | Mars | G07B 15/02 |
| 2020/0252801 A1 | 8/2020 | Kaufer et al. | |

FOREIGN PATENT DOCUMENTS

| | | |
|---|---|---|
| WO | 2016/126565 A1 | 8/2016 |
| WO | 2019/007574 A1 | 1/2019 |

* cited by examiner

COMPUTING DEVICE, METHOD AND SYSTEM FOR CONTROLLING THE ACCESSIBILITY OF DATA

FIELD OF THE INVENTION

The present disclosure relates to a computing device, method and system for controlling the accessibility of data.

BACKGROUND

It is very common that in an organisation nearly every computing device such as a laptop or a desktop computer contains various sensitive and valuable data. In recent years, information security threats come in many different forms. For example, hacking computing devices to access and steal data is a common criminal practice. In addition, laptop computers can be easily misplaced or stolen due to their small physical size, and lost or theft of such computing devices presents a considerable information security risk to the owners. In particular, computing devices with simple authentication methods, for example passwords or pins, may be at great risk and may be easily accessed without authorisation.

SUMMARY OF THE INVENTION

Aspects of the invention are as set out in the independent claims and optional features are set out in the dependent claims. Aspects of the invention may be provided in conjunction with each other and features of one aspect may be applied to other aspects.

A first aspect of the disclosure provides a computing device for controlling the accessibility of data, the computing device comprising:

- a first network interface configured to communicate via a first network, and a second network interface configured to communicate via a second network; and
- a processor coupled to the first and second network interfaces;
- wherein the processor is configured to make a determination about whether to provide access to data in response to receiving a first token via the first network, and a second token via the second network; and
- wherein the determination about whether to provide access to data is based on a comparison of the first token and the second token.

The processor may be coupled to a memory, and wherein the data is held on the memory, and providing access to data may comprise providing access to at least a portion of the data held on the memory.

Providing access to data may comprise the processor sending a request to a remote device for access to at least a portion of the data held on the remote device. The remote device may be the same as the authentication server mentioned below.

Optionally, providing access to at least a portion of the data may comprise determining a portion of the data to provide access to based on at least one of the received first and second tokens. Embodiments of the claims may allow a computer to be shared where each user has access to a different portion of data held on the computer's memory.

Optionally, the determination about whether to provide access to data may also be based on a security policy. The security policy may, for example, determine things such as permissions of users of the computing device and/or the valid lifespan of the tokens T1, T2—for example, the security policy may dictate that the tokens T1, T2 only have a limited lifespan over which they are valid.

In order to provide access to data, a mobile device associated with the computing device and/or user of the computing device may be first configured to send a request to an authentication server for access to the data. The mobile device may be configured to send the request to the authentication server for access to the data in response to a user of the computing device authenticating themselves on the mobile device. It will be understood that a mobile device associated with the computing device may be a mobile device linked with the user's account and/or authenticated by the user. In some examples a mobile device associated with the computing device may be a mobile device paired with (for example, via a secure connection) the computing device. In some examples there may be a plurality of mobile devices associated with the computing device, and vice-versa.

The request for access to data may comprise an identifier, and wherein the identifier provides at least one of (i) information relating to the user of the computing device and/or mobile device, (ii) information relating to the computing device and/or mobile device, and (iii) information relating to the location of the computing device and/or mobile device.

Information relating to the user could include whether or not the user has been authenticated.

Information relating to the location of the computing device and/or mobile device could be a beacon identifier indicating which building/office the computing device is in so that different portions of the data can be made accessible (for example, unlocked) depending on where the user is. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation.

Information relating to the computing device could include host computer information such as a MAC address, an IP address, a wireless network ID, time information, and GPS information.

Embodiments of the claims may enable Bring Your Own Device (BYOD) which allows employees to bring their own computing devices to their workplace to work on. The computing device may be operated in a particular location (for example a user's work location) by a particular user, then a portion of data is made accessible, for example based on the location and/or user, but when the computing device is operated away from that particular location, or by a different user, then a different portion of data is made accessible.

Providing access to at least a portion of the data may comprise determining a portion of the data to provide access to based on the identifier. For example, the identifier may provide the information (such as the user's profile and permission level) relating to the user of the computing device. Based on the user's information, the computing device may only make accessible the portion of the data that the user is authorised to have access to. In some examples, the computing device may make accessible (for example, unlock) the portion of the data by selecting a map of the data store on the memory. Additionally and/or alternatively, the computing device may make accessible the portion of the data by sending a request to a remote device for access to at least a portion of the data held on a remote device and download the data after the request is accepted. In some examples, the remote device may be the same as the authentication server mentioned above.

In some examples, the data may be encrypted, and the processor may be configured to provide access to data by decrypting the data based on at least one of the first and second tokens. For example, the data may be protected by password and the processor may be configured to read the password from at least one of the first and second tokens.

Optionally at least one of the first network interface and the second network interface may be configured to communicate via a short-range radio-frequency network, and the other network interface may be configured to communicate via a long-range radio-frequency network. The short-range radio-frequency network may be a Bluetooth® network. The long-range radio frequency network may be a mobile telecoms network and/or the internet.

Another aspect of the disclosure provides a system for controlling the accessibility of data comprising the computing device and an authentication server, wherein the authentication server is configured to send the first and second tokens to the computing device in response to receiving a request for access to the data.

The authentication server may be configured to send the first token to the computing device via at least one of (i) a mobile device associated with and/or coupled to (for example, in communication with) the computing device via the first network and (ii) a beacon in communication with the computing device via the first network, and send the second token to the computing device directly via the second network. As described above, it will be understood that a mobile device associated with the computing device may be a mobile device linked with the user's account and/or authenticated by the user. In some examples a mobile device associated with the computing device may be a mobile device paired with (for example, via a secure connection) the computing device. In some examples there may be a plurality of mobile devices associated with the computing device, and vice-versa.

For example, the authentication server may be configured to send the first token to the beacon or the mobile device over the same network that it also sends the second token to the computing device on e.g. mobile telecoms network or internet. In each example, the beacon/mobile device may then transmit the first token to the computing device over a different network e.g. Bluetooth®.

The request for access to the data may first need to be authenticated. For example, the request for access to the data needs the user to input the unique user identifier (e.g. employee number) or/and password to authenticate the request.

The authentication server may be configured to create the first and second tokens based on an identifier wherein the identifier may provide at least one of (i) information relating to the user of the computing device and/or mobile device, (ii) information relating to the computing device and/or mobile device, and (iii) information relating to the location of the computing device and/or mobile device. For example, the first and second tokens may be the identifier itself.

Additionally and/or alternatively, the first and second tokens may be created using an identifier and other information (e.g. time of the request). It will be understood that in some examples the first and second tokens may be created by combining (e.g. linking or attaching) the identifier and other information together. Therefore, the computing device may be able to read the identifier from the first and second tokens directly, or decompose the identifier from the first and second tokens. In addition, the computing device may be able to read the identifier as well as other information (e.g. time of the request) from the received first and second tokens.

In some examples the authentication server is configured to send a security policy to the computing device, for example with the second token T2. The security policy may, for example, determine things such as permissions of users of the computing device and/or the valid lifespan of the tokens T1, T2—for example, the security policy may dictate that the tokens T1, T2 only have a limited lifespan over which they are valid. In some examples the system comprises the beacon, and the beacon is configured to broadcast the first token to the computing device via the first network. In other examples the system may comprise the mobile device, and the computing device may be configured to obtain the token from the mobile device when a secure connection has been established between the mobile device and the computing device via the first network.

In order to provide access to data the mobile device may be first configured to send a request to an authentication server for access to the data. The mobile device may be configured to send the request to the authentication server for access to the data in response to a user of the mobile device authenticating themselves on the mobile device.

The first token may be related to the second token. For example the first token is a mathematical function of the second token or vice-versa, and/or the token is linked to the user e.g. to the user's account.

In some examples the computing device may also be configured to control other components of the computing device based on comparison of the two tokens T1, T2. For example, the computing device may be configured to control a camera, a microphone and a power controller (for example to turn itself off, or to turn selected components of the computing device on or off). Additionally and/or alternatively, the computing device may be configured to control these components based on a security policy received from the authentication server.

Another aspect of the disclosure provides a method of controlling the accessibility of data by a computing device, the method comprising:

sending a request for access to data to an authentication server; and receiving a first token from the authentication server via a first network, and a second token from the authentication server via a second network; and determining whether to provide access to the data based on a comparison of the first token and the second token.

Providing access to data may comprise providing access to at least a portion of the data held on a memory of the computing device. Providing access to at least a portion of the data may comprise selecting a map of the data store on the memory. Additionally and/or alternatively, providing access to data may comprise the computing device sending a request to a remote device for access to at least a portion of the data held on a remote device. The remote device may be the same as the authentication server mentioned above.

The request for access to data may comprise an identifier. The identifier may provide at least one of (i) information relating to the user of the computing device, (ii) information relating to the computing device, and (iii) information relating to the location of the computing device.

Information relating to the user could include whether or not the user has been authenticated.

Information relating to the location of the computing device could be a beacon identifier indicating which building/office the computing device is so that different portions of the data can be made accessible (for example, unlocked) depending on where the user is. For example, the location may be determined from the beacon identifier—for example by performing a lookup operation in a database storing locations for each beacon. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation in a database storing locations for various cell mast information.

Information relating to the computing device could include host computer information such as a MAC address, an IP address, a wireless network ID, time information, and GPS information.

Embodiments of the claims may enable Bring Your Own Device (BYOD) which allows employees to bring their own computing devices to their workplace to work on. The computing device may be operated in a particular location (for example a user's work location) by a particular user, then a portion of the data is made accessible, but when the computing device is operated away from that particular location, or by a different user, then a different portion of the data is made accessible.

In some examples the method further comprises sending a security policy to the computing device, for example with the second token T2. The security policy may, for example, determine things such as permissions of users of the computing device and/or the valid lifespan of the tokens T1, T2—for example, the security policy may dictate that the tokens T1, T2 only have a limited lifespan over which they are valid.

Providing access to at least a portion of the data may comprise determining a portion of the data to provide access to based on at least one of (i) the received first and/or second tokens and (ii) the identifier.

In some examples the computing device may control other components of the computing device based on comparison of the two tokens T1, T2. For example, the computing device may control a camera, a microphone and a power controller (for example to turn itself off, or to turn selected components of the computing device on or off). Additionally and/or alternatively, the computing device may control these components based on a security policy received from the authentication server.

In some examples, the data may be encrypted, and providing access to the data may comprise decrypting the data based on at least one of the first and second tokens. For example, the data may be protected by password and the processor may be configured to read the password from at least one of the first and second tokens.

The method may comprise receiving one of the tokens via a short-range radio-frequency network, and receiving the other token via a long-range radio-frequency network.

The short-range radio-frequency network may be a Bluetooth® network.

The method may comprise sending the request to the authentication server for access to the data from a mobile device associated with and/or coupled to the computing device. It will be understood that a mobile device associated with the computing device may be a mobile device linked with the user's account or authenticated by the user. In some examples a mobile device associated with the computing device may be a mobile device paired with (for example, via a secure connection) the computing device. In some examples there may be a plurality of mobile devices associated with the computing device, and vice-versa.

The method may comprise sending the request to the authentication server for access to the data in response to a user of the computing device authenticating themselves on at least one of (i) a mobile device in communication with the computing device and (ii) a mobile device linked to an account operating on the computing device.

Sending a request for access to data may comprise at least one of (i) a mobile device in communication with the computing device sending a request for access to data and (ii) a mobile device linked to an account operating on the computing device sending a request for access to data.

The method may comprise receiving the first token at the computing device via at least one of (i) a mobile device coupled to the computing device via the first network and (ii) a beacon in communication with the computing device via the first network, and receiving the second token at the computing device directly via the second network.

Receiving the first token may comprise the mobile device or beacon broadcasting the first token to the computing device via the first network. Alternatively, deceiving the first token may comprise obtaining the first token from the mobile device or beacon in response to a secure connection being established between the beacon or mobile device via the first network.

In all aspects, the first token may be related to the second token. For example the first token is a mathematical function of the second token or vice-versa, or the token is linked to the user e.g. to the user's account. In some examples at least one of the first token and the second token may be created by the authentication server to perform certain functionality on the computing device, for example to disable certain components (such as the power or the memory) or to damage (for example, physically damage such as burn) certain components such as the memory to make the data permanently inaccessible. The at least one of the first token and the second token may be created to perform this functionality based on a command entered by a user, for example a user of the mobile device associated with and/or in communication with the computing device. In some examples it will be understood that the mobile device itself may create at least one of these tokens (such as the first token T1) locally (i.e. on the mobile device) to perform this functionality on the computing device. In some examples the computing device 40 may be configured to perform such functionality on receipt of only one token, such as the first token T1.

In another aspect, a computer program may comprise instructions which, when executed by a computing device, cause the computing device to perform the method.

Another aspect of the disclosure provides a computing device for controlling the accessibility of selected components associated with and/or coupled to a computing device, the computing device comprising a network interface configured to communicate with at least one beacon in proximity to the computing device. The computing device is configured to receive, via the network interface, at least one signal from the at least one beacon, and wherein the computing device is configured to make a determination about whether to provide access to the components based on (a) a security policy and (b) the received at least one signal from the at least one beacon.

It will be understood that the received at least one signal from the at least one beacon may comprise beacon information. For example, the at least one signal from the at least one beacon may comprise information indicative of a location of the at least one beacon. The location information could be inferred, for example, from a beacon identifier by performing a lookup operation in a database of known locations for each beacon identifier.

The security policy may define the accessibility of selected components based at least on the information indicative of the location of the at least one beacon. The security policy may be held locally on the computing device, or remotely, for example on an authentication server.

In some examples the computing device may have a first network interface configured to communicate via a first network, and a second network interface configured to communicate via a second network. It will be understood that the first network interface may be configured to communicate over a short-range radio frequency network (such as Wi-Fi®, Bluetooth®, Zigbee®) and the second network interface may be configured to communication a long-range radio frequency network (such as a mobile telecommunications network, such as via GSM, 3G, 4G, 5G).

In some examples the computing device may be configured to make a determination about whether to provide access to selected components associated with and/or coupled to the computing device based on (a) a security policy received via the first network, and (b) beacon information received via the second network.

In some examples the computing device is configured to make a determination about whether to provide access to the selected components also based on information relating to the user of the computing device and/or a unique identifier of the computing device such as the user's profile and security permission level, and/or a unique identifier of the computing device. For example, the security policy defines the accessibility of selected components based also on the information relating to the user of the computing device and/or a unique identifier of the computing device.

In some examples the computing device may be configured to make a determination about whether to provide access to the selected components additionally or alternatively based on other location information. The other location information may comprise the location of at least one of (i) the computing device, (ii) a mobile device associated with and/or coupled to the computing device, and (iii) a beacon in communication with the computing device. For example, the location information could be based on or inferred from local network information—such as SSID's and/or beacon identifiers that can be seen by the computing device and/or mobile device, and/or information such as cell mast information (e.g. eNodeB or gNodeB information). The location may be inferred from that information, for example, by performing a lookup operation in a database of known locations for various cell mast information. In some examples the location information may also be based on altitude information, for example from an altitude sensor, and/or satellite position information such as GPS information. It will be understood that in some examples the computing device may be configured to use this other location information instead of the beacon information.

Optionally, providing access to the selected components may be controlled via a physical means. For example, the physical means may comprise at least one of (i) a physical switch and (ii) a power control module. The physical switch may be configured to connect or disconnect the components to/from the processor. Additionally and/or alternatively, the power control module may be configured to turn on/off the components by adjusting a current supplied to the component above or below a threshold operating current of the components.

Providing access to the components may comprise providing access to at least one of memory, audio sensors such as a microphone, and imaging sensors such as a camera associated with and/or coupled to the computing device. In some examples, the computing device may provide access to selected components (such as memory) and not provide access to other components (such as a microphone or a camera), for example based on a security policy.

Although a computing device for controlling the accessibility of components associated with and/or coupled to the computing device has been described, it will be understood that in some examples of the disclosure a mobile device may similarly be configured in a similar way for controlling the accessibility of components associated with and/or coupled to the mobile device.

As described above, it will be understood that a mobile device associated with the computing device may be a mobile device linked with the user's account and/or authenticated by the user. In some examples a mobile device associated with the computing device may be a mobile device paired with (for example, via a secure connection) the computing device. In some examples there may be a plurality of mobile devices associated with the computing device, and vice-versa.

The beacon may be configured to send location and/or device information relating to devices in range and/or connected to (for example, in communication with) the beacon to the authentication server. Optionally, the beacon may be configured to send location information (such as the altitude and GPS information of the beacon) and/or device information relating to the beacon (such as the beacon identifier) to an authentication server. The computing device may be configured to send location and/or device information relating to the computing device and/or the beacon that the computing device is in communication with.

The authentication server may be configured to send first and second tokens to the computing device in response to receiving information based on at least one of (i) the computing device, (ii) the mobile device associated with and/or coupled to the computing device, and (iii) the beacon in communication with the computing device.

For example, the first and second tokens may be created by the authentication server using the information received such as location/device information of the computing device. The first token may be related to the second token. For example the first token is a mathematical function of the second token or vice-versa, and/or the token is linked to the user e.g. to the user's account.

Optionally, the authentication server may be configured to send the first token and second tokens via different networks. For example, the authentication server may be configured to send the first token to the computing device via at least one of (i) the mobile device associated with and/or coupled to the computing device and (ii) the beacon in communication with the computing device, and send the second token to the computing device directly via the second network.

The security policy may, for example, determine things such as permissions of users of the computing device and/or the valid lifespan of the tokens T1, T2—for example, the security policy may dictate that the tokens T1, T2 only have a limited lifespan over which they are valid.

The computing device may be configured to make a determination about whether to provide access to the components also based on the comparison of the first token and the second token.

Another aspect of the disclosure provides a method for controlling the accessibility of selected components associated with and/or coupled to a computing device, the method comprising:

obtaining beacon information from at least one beacon in proximity to the computing device; and determining whether to provide access to the selected components based on (a) a security policy (b) the beacon information.

The beacon information may comprise information indicative of a location of the at least one beacon. For example, the location could be inferred from a beacon identifier by performing a lookup operation in a database of known locations for each beacon identifier.

In some examples the method also comprises making a determination about whether to provide access to the selected components also based on other location information. Optionally, the other location information may comprise the location of at least one of (i) the computing device, (ii) the mobile device associated with and/or coupled to the computing device, and (iii) the beacon in communication with the computing device. For example, the location information could be based on or inferred from local network information—such as SSID's and/or beacon identifiers that can be seen by the computing device and/or mobile device, and/or information such as cell mast information (e.g. eNodeB or gNodeB information). For example, the location may be inferred from that information, for example, by performing a lookup operation in a database of known locations for various cell mast information. In some examples the location information may also be based on altitude information, for example from an altitude sensor, and/or satellite position information such as GPS information. It will be understood that in some examples the computing device may be configured to use this other location information instead of the beacon information.

The security policy may define the accessibility of selected components based at least on the information indicative of the location of the at least one beacon. In some examples the security policy defines the accessibility of selected components based also on the information relating to the user of the computing device and/or a unique identifier of the computing device.

In some examples the method comprises receiving the at least one signal from the at least one beacon via a first network, and receiving the security policy from a second network.

In some examples the method comprises making a determination about whether to provide access to the selected components also based on information relating to the user of the computing device and/or a unique identifier of the computing device.

In some examples providing access to the selected components is controlled via a physical means. For example, the physical means comprises at least one of (i) a physical switch such as an FET and (ii) a power control module.

It will be understood that providing access to the selected components may comprise providing access to at least one of memory, audio sensors and imaging sensors associated with and/or coupled to the computing device.

The method may comprise sending the information based on at least one of (i) the computing device, (ii) a mobile device associated with and/or coupled to the computing device, and (iii) a beacon in communication with the computing device to an authentication server from (i) the computing device, (ii) a mobile device associated with and/or coupled to the computing device, and (iii) a beacon in communication with the computing device, and optionally making the determination about whether to provide access to the selected components at the authentication server.

Accordingly, in another aspect of the disclosure there is provided an authentication server for controlling the accessibility of selected components associated with and/or coupled to a computing device, wherein the authentication server is configured to obtain beacon information based on at least one beacon in proximity to the computing device; and determine the accessibility of components based on the beacon information and a security policy.

The authentication server may be configured to determine location information from the obtained beacon information. The security policy may define the accessibility of selected components based at least on the information indicative of the location of the at least one beacon.

In some examples the authentication server is configured to make a determination about whether to provide access to the selected components also based on information relating to the user of the computing device and/or a unique identifier of the computing device. It will be understood that the security policy may define the accessibility of selected components based also on the information relating to the user of the computing device and/or a unique identifier of the computing device.

In some examples the authentication server is configured to providing access to the selected components by triggering the sending of at least one token to the computing device. For example, the authentication server may be configured to providing access to the selected components by triggering the sending of a first token to the computing device via a first network, and a second token to the computing device via a second network. The authentication server may be configured to send the second token to the computing device via a second network and via the at least one beacon.

In some examples, however, the authentication server may be configured to determine the accessibility of the selected components based on location information. This may be inferred from the beacon information (as noted above), or obtained in other ways. The location information may comprise the location of at least one of (i) the computing device, (ii) a mobile device associated with and/or coupled to the computing device, and (iii) a beacon in communication with the computing device. For example, the location information could be based on or inferred from local network information—such as SSID's and/or beacon identifiers that can be seen by the computing device and/or mobile device, and/or information such as cell mast information (e.g. eNodeB or gNodeB information). The location may be inferred from that information, for example, by performing a lookup operation in a database of known locations for various cell mast information. In some examples the location information may also be based on altitude information, for example from an altitude sensor, and/or satellite position information such as GPS information. It will be understood that in some examples the authentication server may be configured to use this location information instead of the beacon information.

It will be understood that providing access to the selected components may comprise providing access to at least one of memory, audio sensors and imaging sensors associated with and/or coupled to the computing device.

It will also be understood that controlling the accessibility of selected components may comprise disabling (temporarily and/or permanently) components associated with and/or coupled to the computing device. For example, controlling the accessibility may comprise wiping a memory associated with and/or coupled to the computing device, and/or permanently damaging a selected component such as the memory, for example with a series of voltage pulses.

DRAWINGS

Figure 1B:
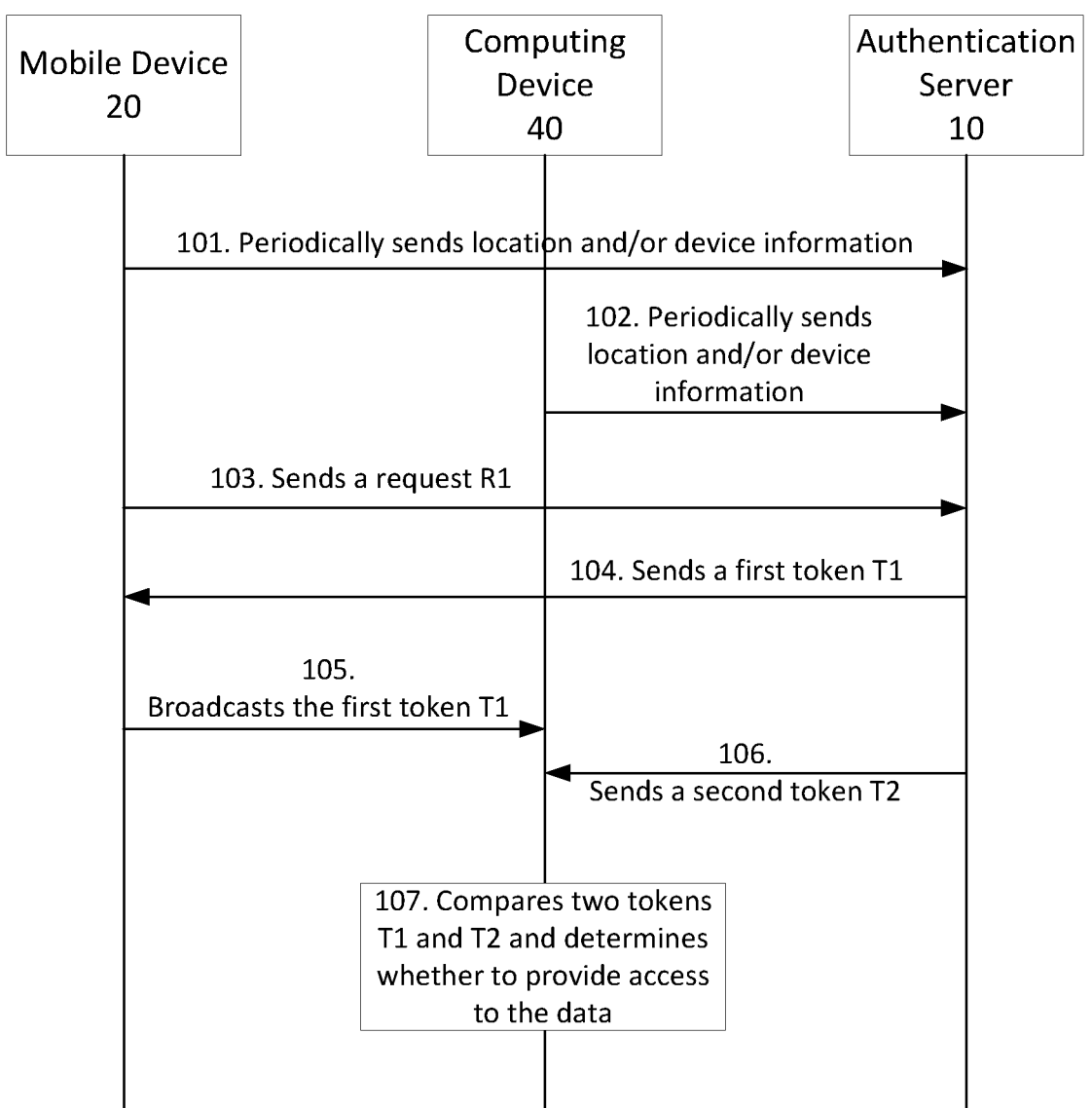
Figure 2A:
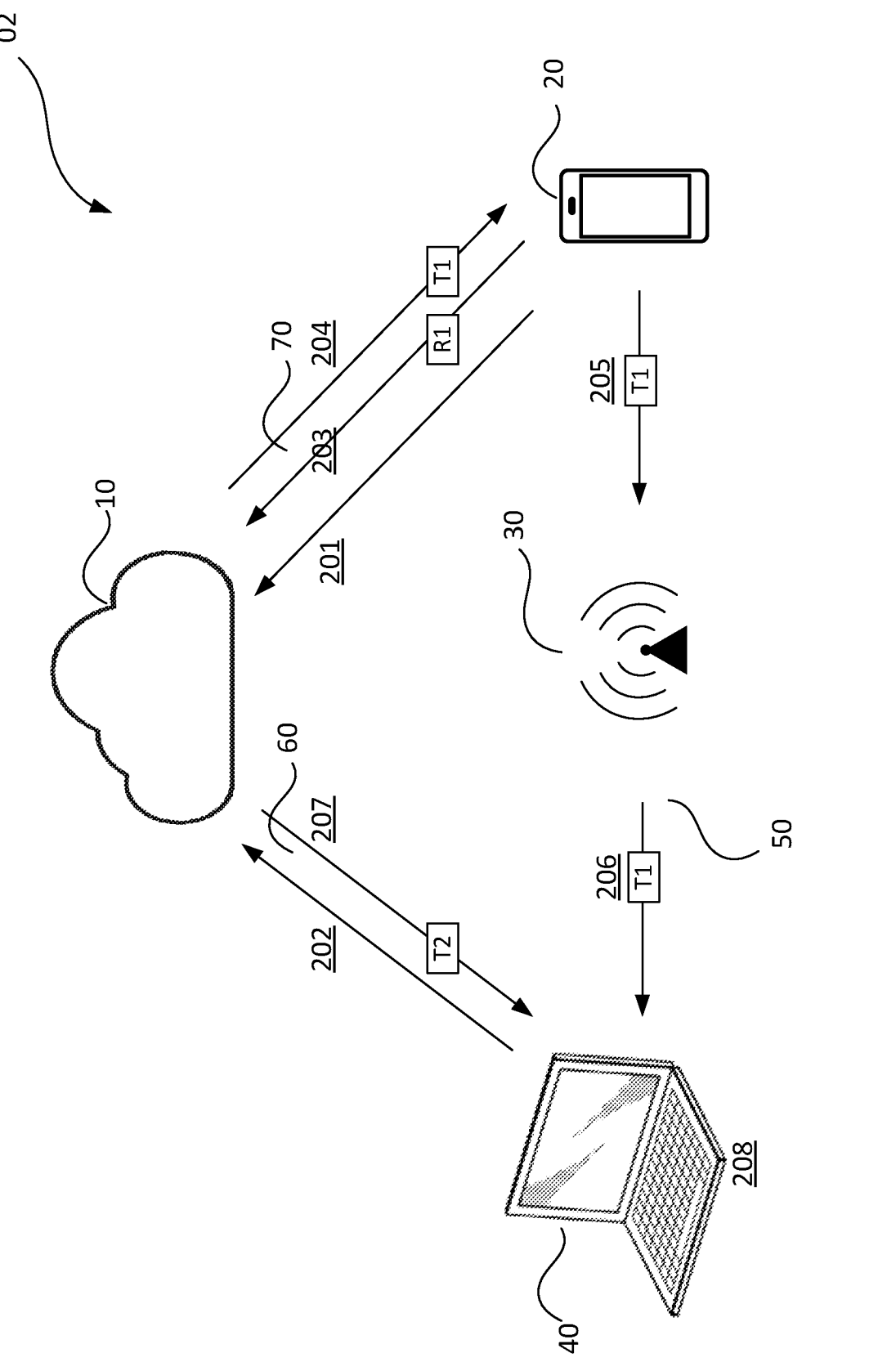
Figure 2B:
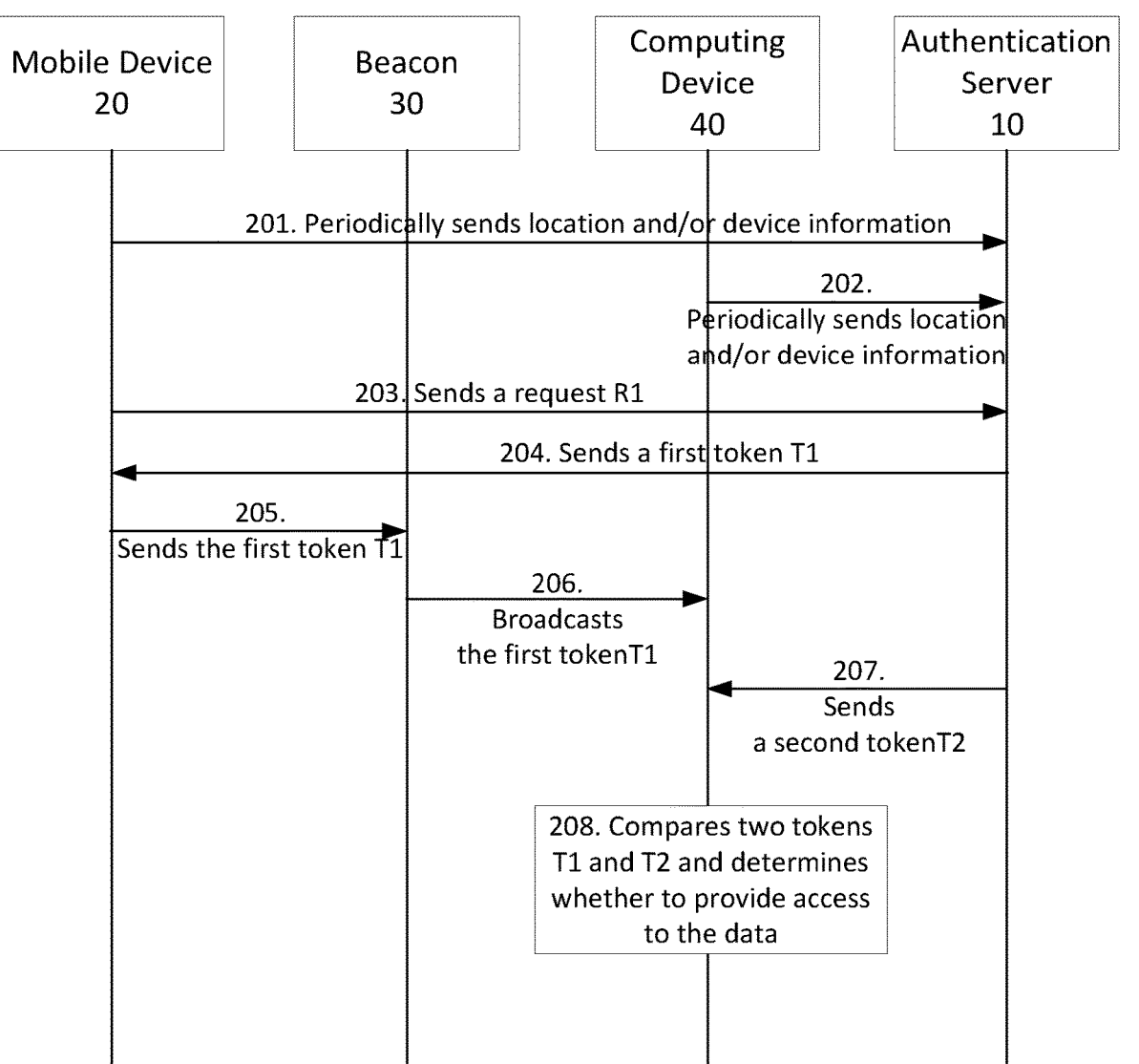
Figure 3A:
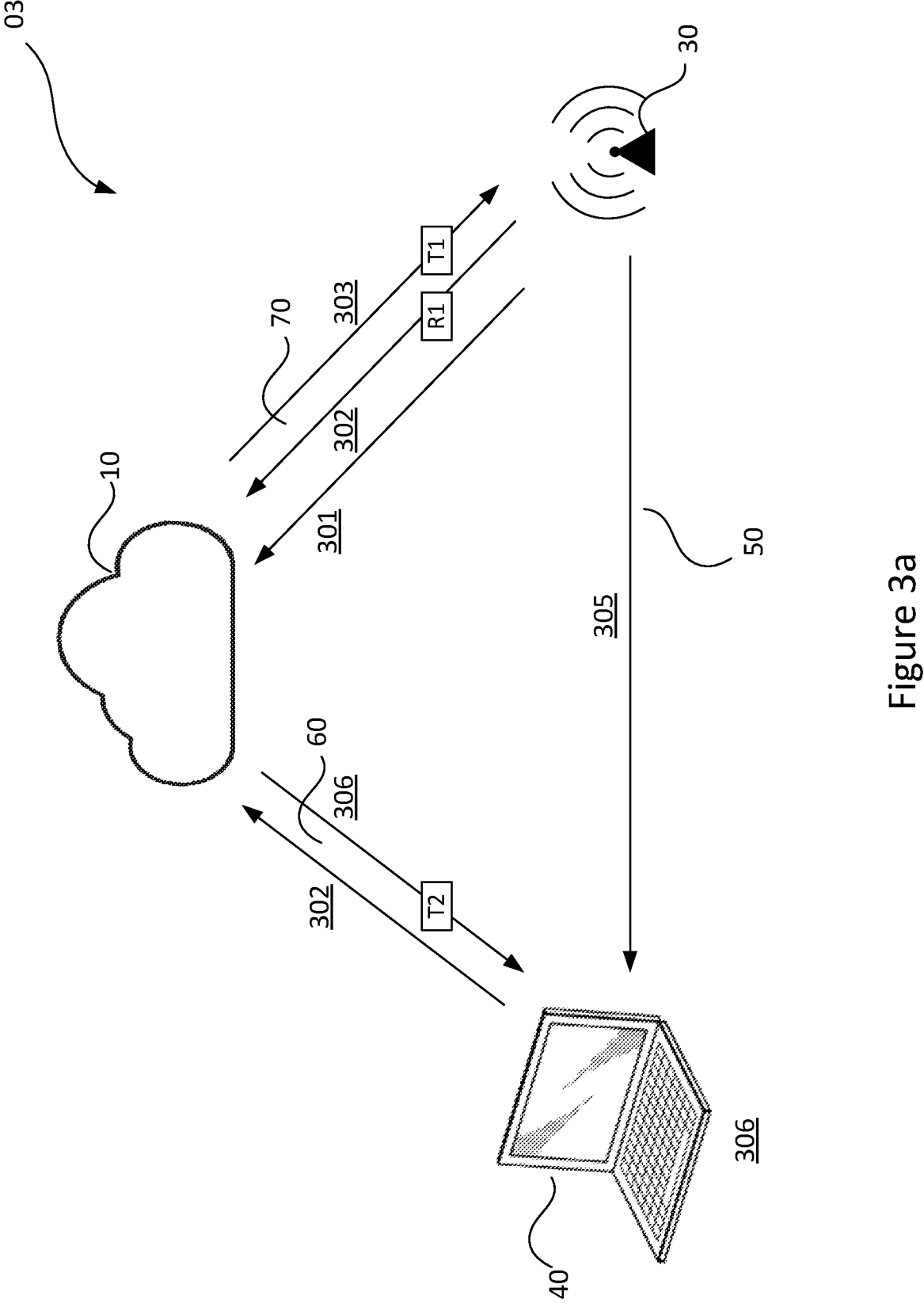
Figure 3B:
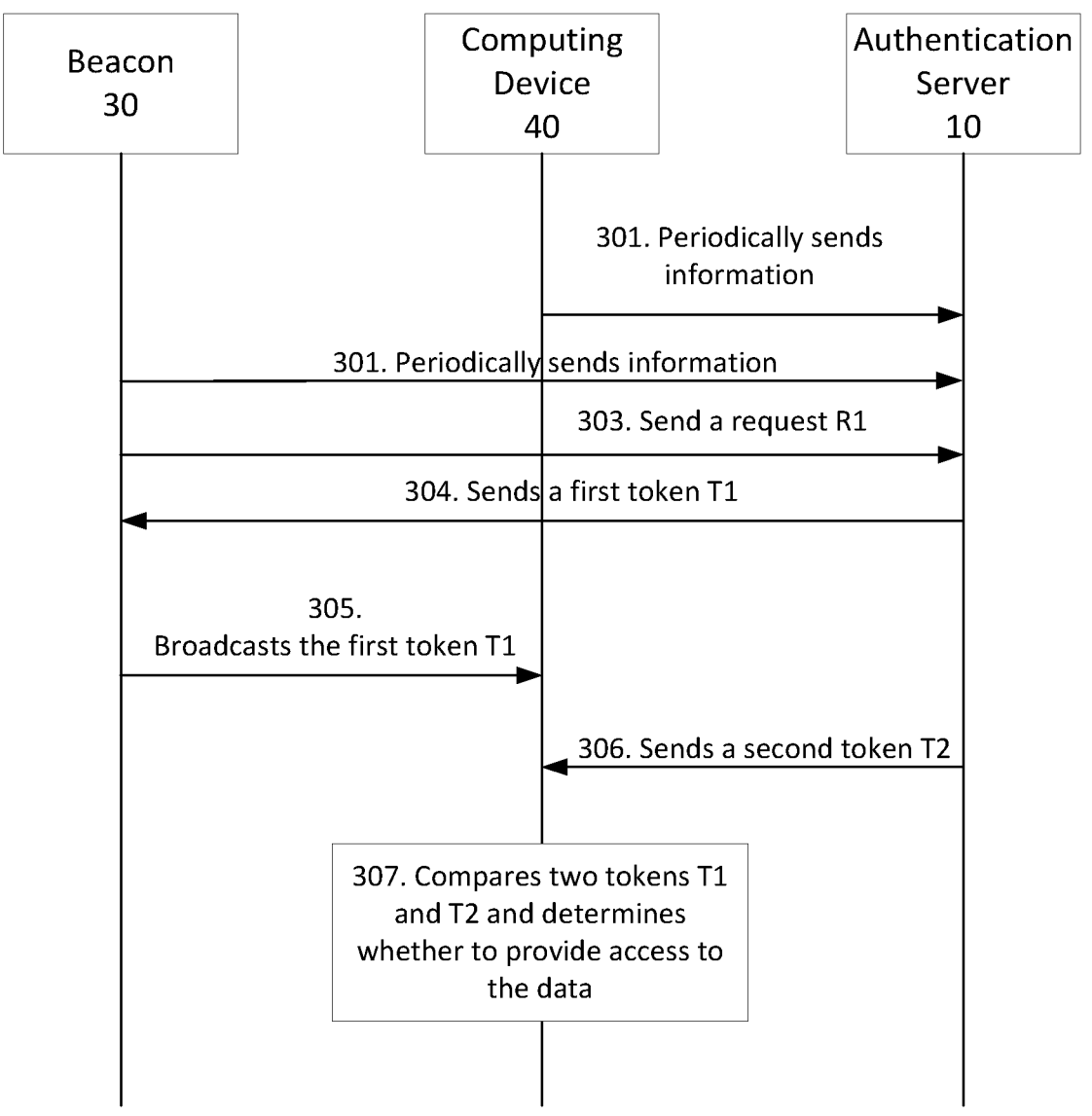
Figure 4:
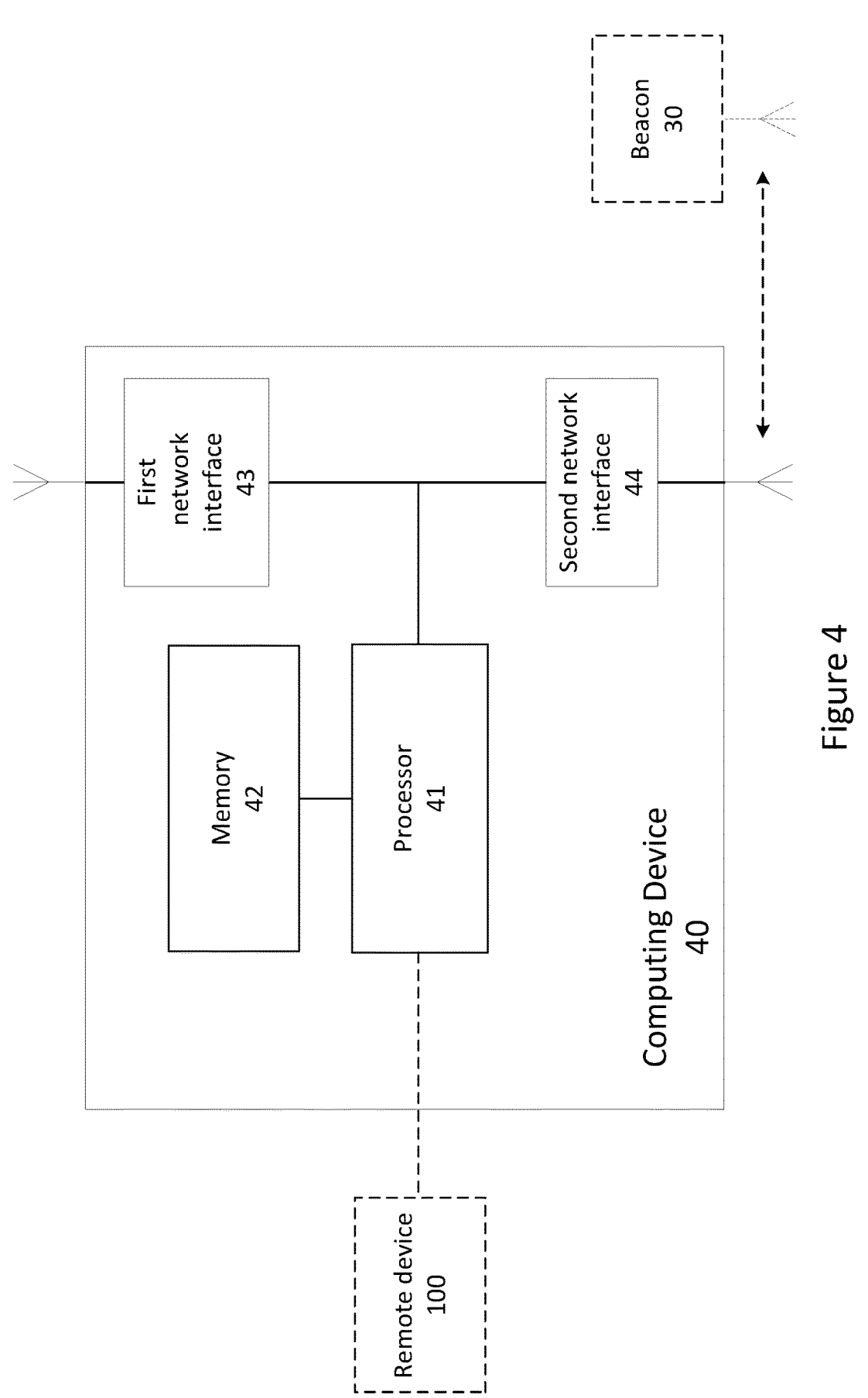
Figure 5:
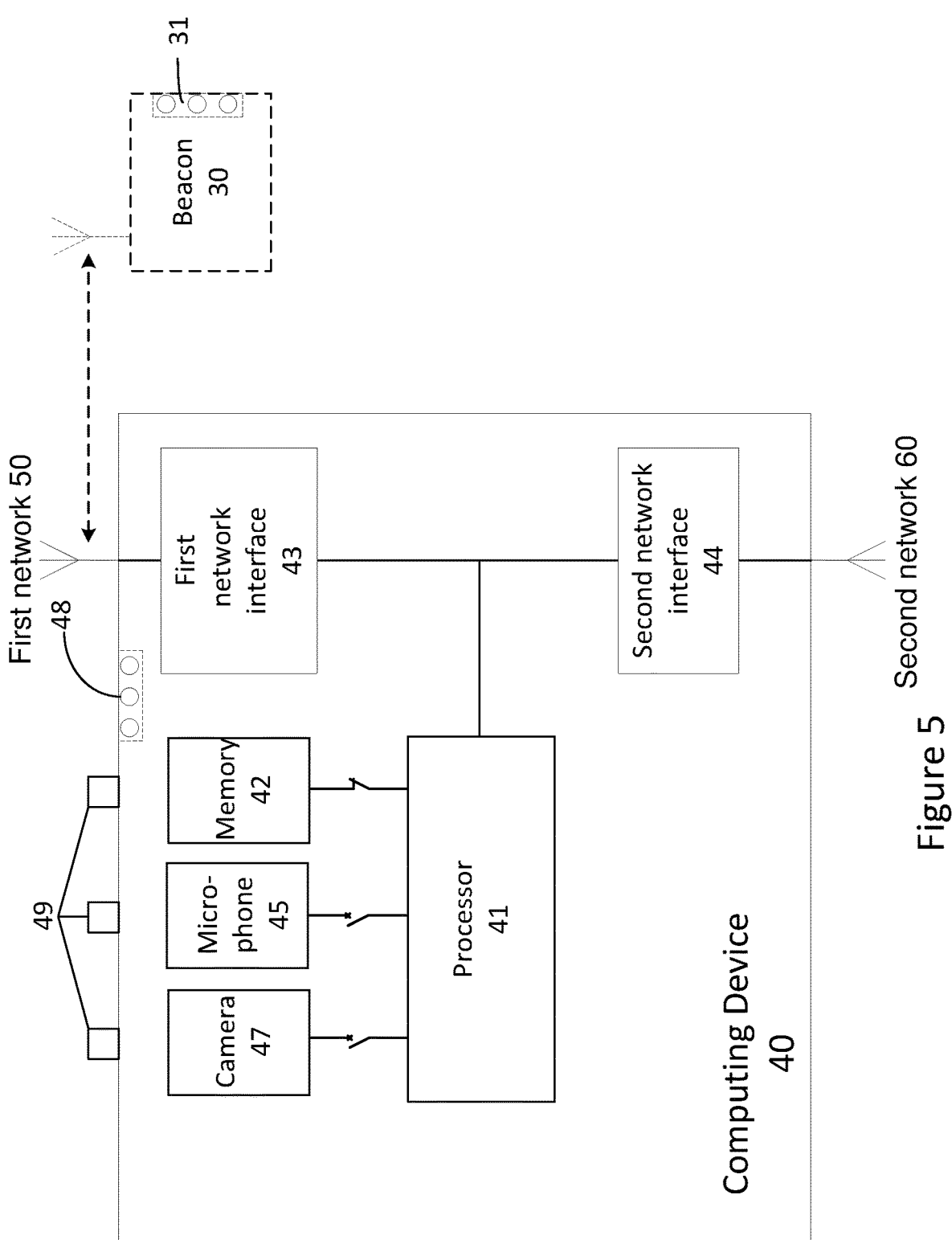
Figure 6:
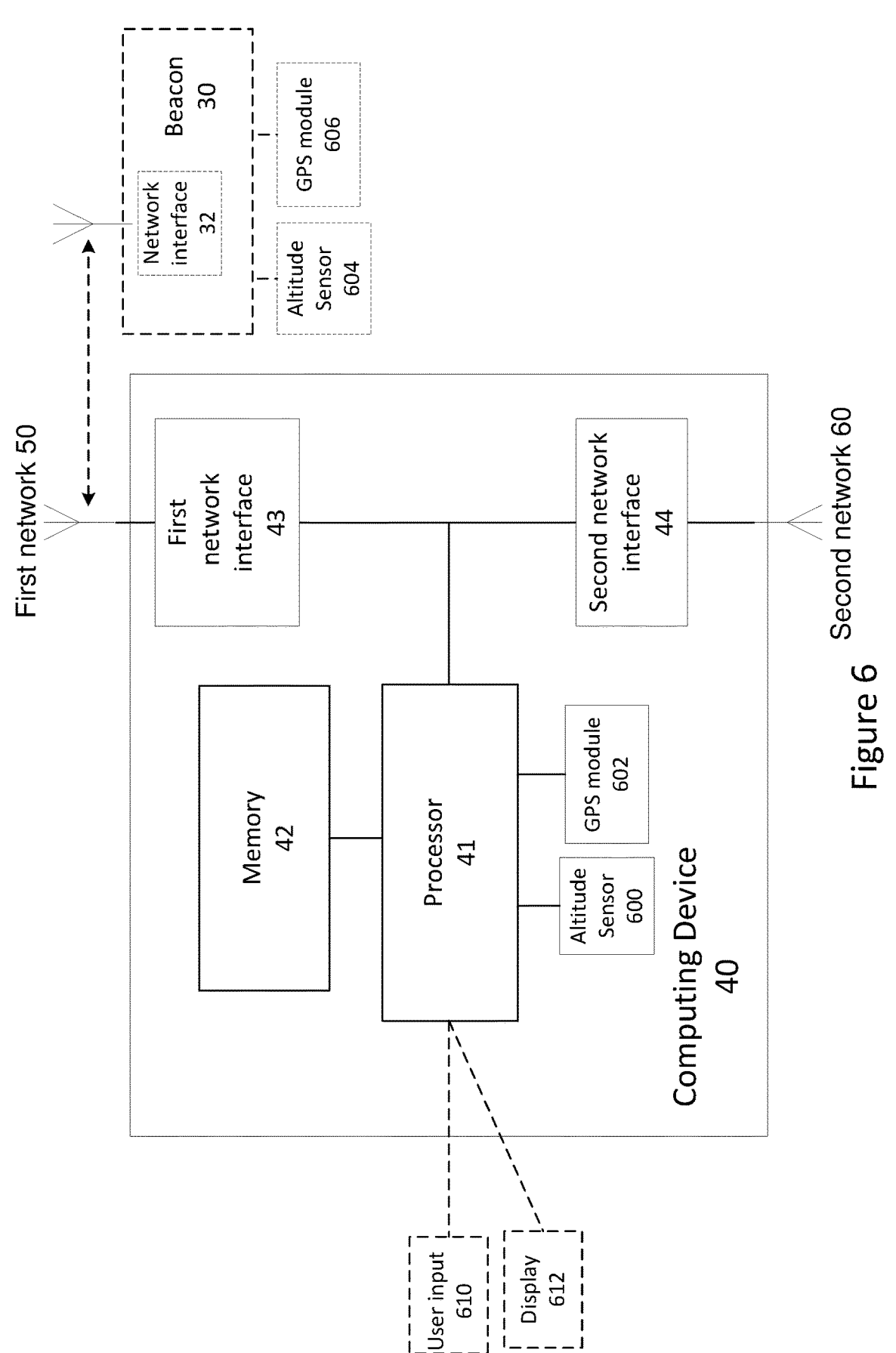
Figure 7A:
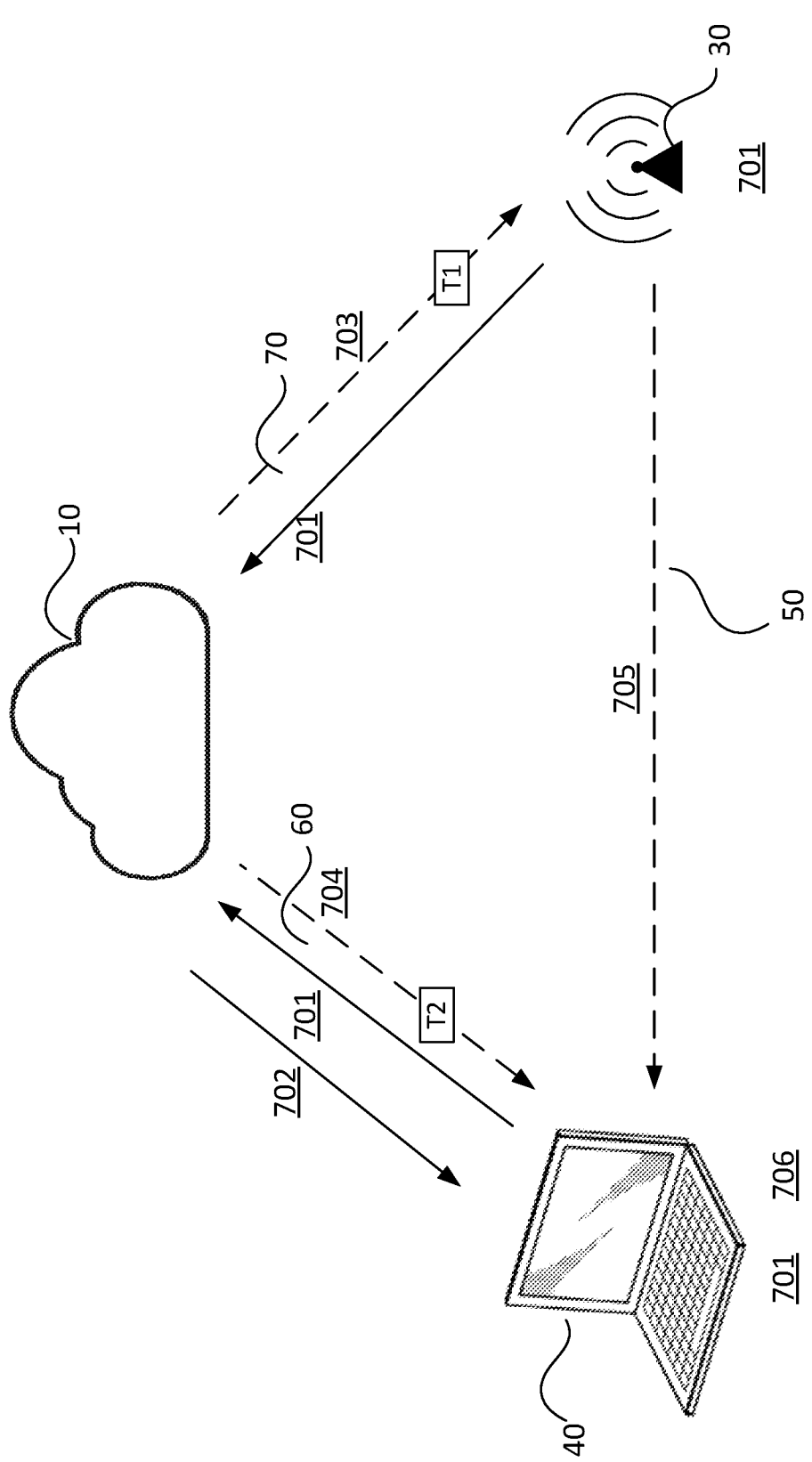
Figure 7B:
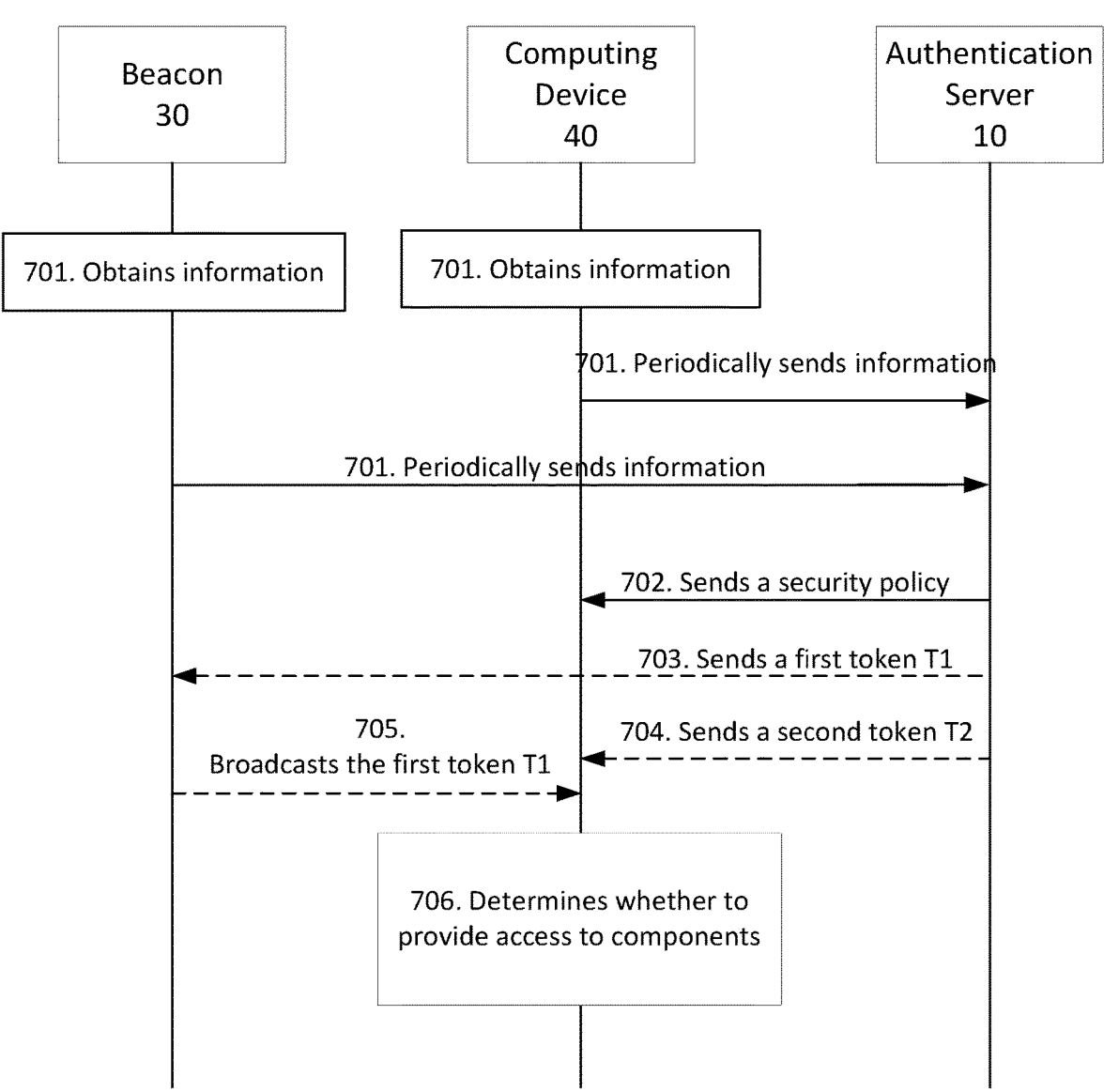
Figure 8A:
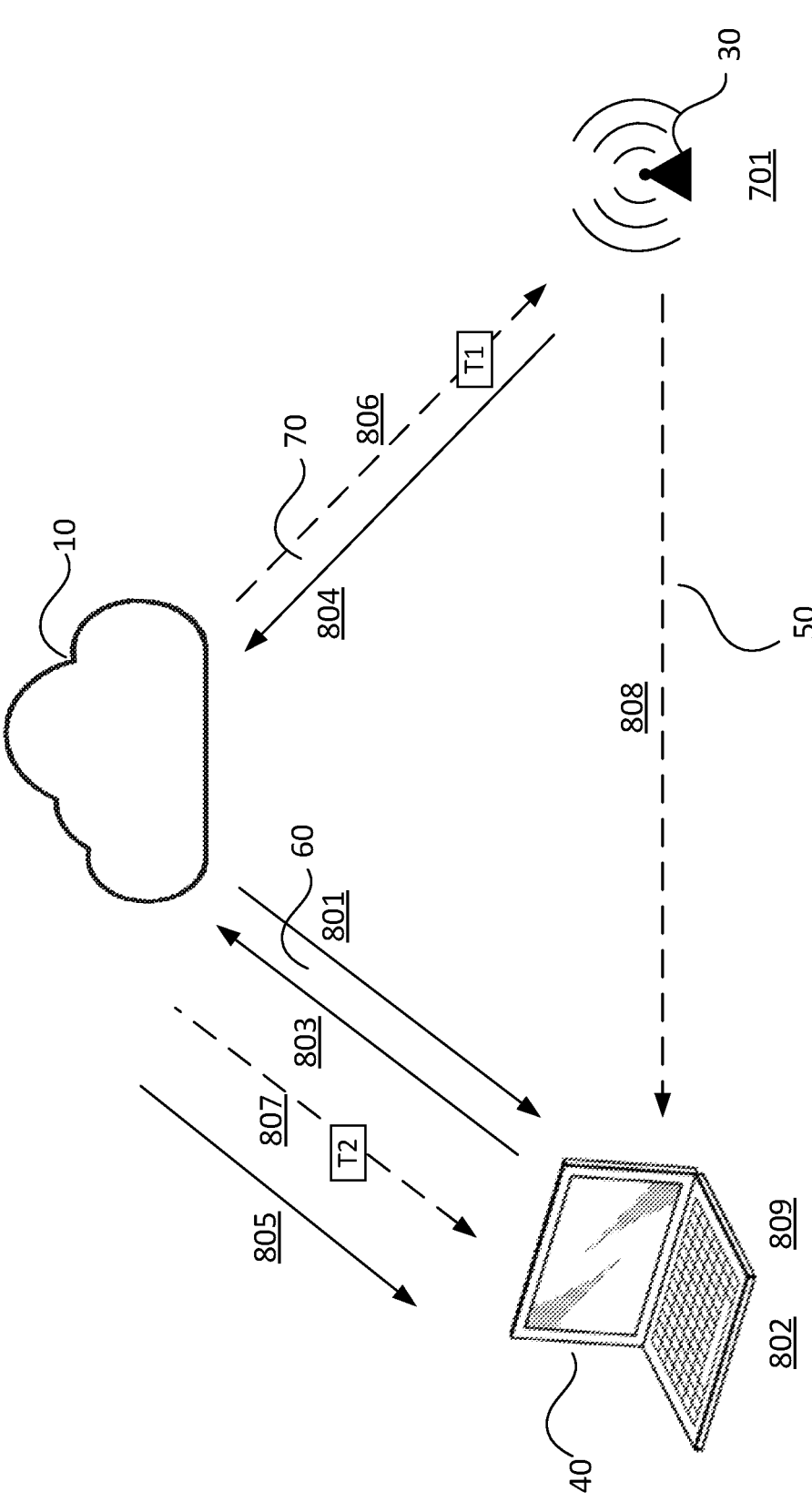
Figure 8B:
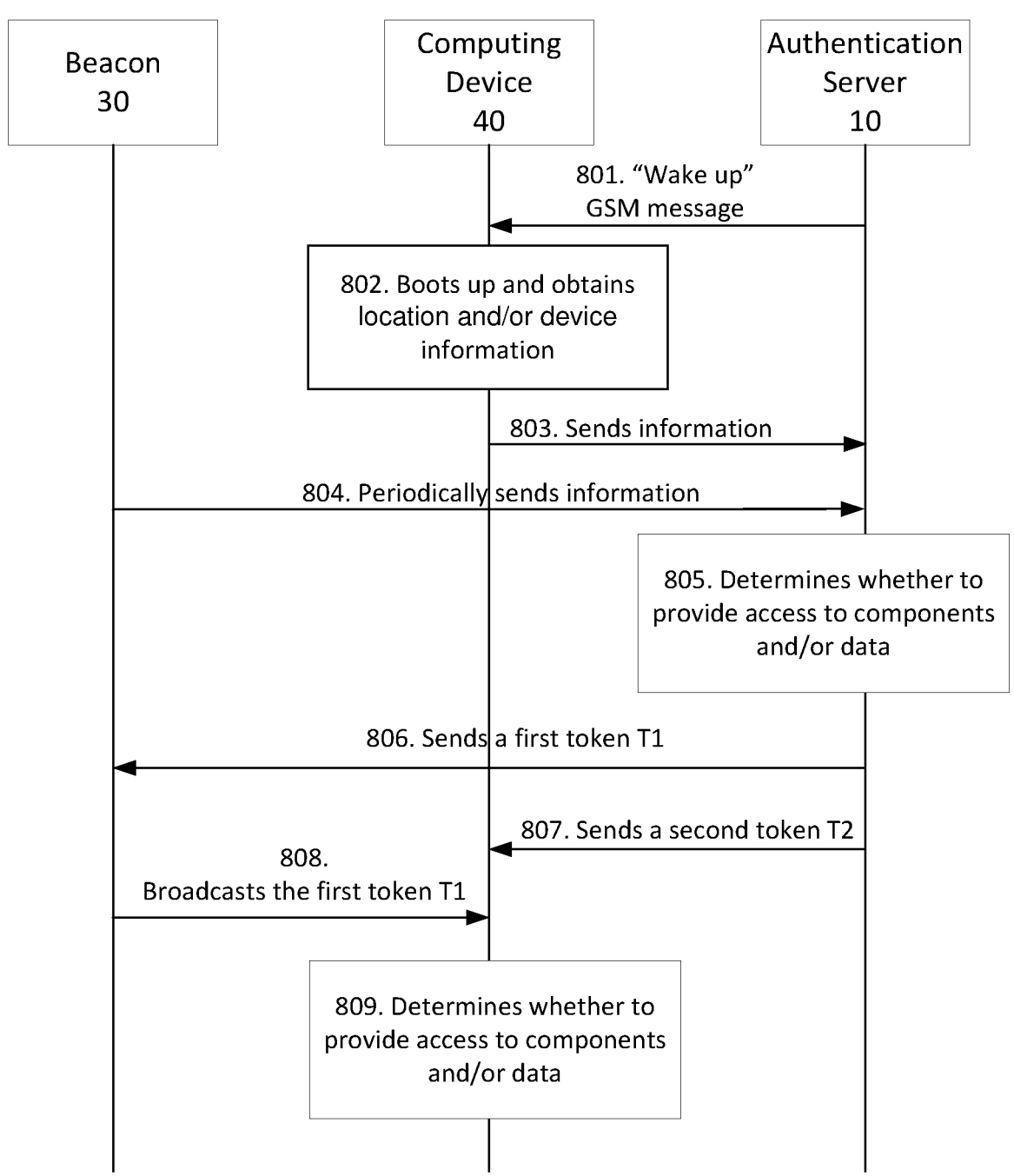

Embodiments of the disclosure will now be described, by way of example only, with reference to the accompanying drawings, in which:

FIG. 1 comprises FIGS. 1a and 1b, wherein FIG. 1a is an illustration of a first example of a system for controlling the accessibility of data comprising a computing device, a mobile device coupled with a beacon and an authentication server; FIG. 1b is a sequence diagram of an example method for use with the system of FIG. 1a;

FIG. 2 comprises FIGS. 2a and 2b, wherein FIG. 2a is an illustration of a second example of a system for controlling the accessibility of data comprising a computing device, a mobile device, a beacon and an authentication server; and FIG. 2b is a sequence diagram of an example method for use with the system of FIG. 2a;

FIG. 3 comprises FIGS. 3a and 3b, wherein FIG. 3a is an illustration of a third example of a system for controlling the accessibility of data comprising a computing device, a beacon and an authentication server, and FIG. 3b is a sequence diagram of an example method for use with the system of FIG. 3a; and FIG. 4 is a functional block diagram of a first example computing device for use with the system and method of any of FIGS. 1 to 3 and FIGS. 7 to 8; and FIG. 5 is a functional block diagram of another example computing device for use with the system and method of any of FIGS. 1 to 3 and FIGS. 7 to 8; and FIG. 6 is a functional block diagram of another example computing device for use with the system and method of any of FIGS. 1 to 3 and FIGS. 7 to 8; and FIG. 7 comprises FIGS. 7a and 7b, wherein FIG. 7a is another illustration of an example of a system for controlling the accessibility of components comprising a computing device, a beacon and an authentication server, and FIG. 7b is a sequence diagram of an example method for use with the system of FIG. 7a; and FIG. 8 comprises FIGS. 8a and 8b, wherein FIG. 8a is another illustration of the third example of a system for controlling the accessibility of components comprising a computing device, a beacon and an authentication server, and FIG. 8b is a sequence diagram of an example method for use with the system of FIG. 8a.

SPECIFIC DESCRIPTION

The following detailed description illustrates exemplary embodiments of the present disclosure and the ways in which they can be implemented. Although some modes of carrying out the present disclosure have been disclosed, those skilled in the art would recognize that other embodiments for carrying out or practising the present disclosure are also possible.

FIG. 1a is an illustration of a first example of a system for controlling the accessibility of data. As shown in FIG. 1a, the system 01 comprises a computing device 40, a mobile device 20 coupled with a beacon 30, an authentication server 10, a first network 50 between the computing device 40 and the mobile device 20, and a second network 60 between the authentication server 10 and the computing device 40 as well as between the authentication server 10 and the mobile device 20.

An example computing device 40 will be described in more detail with respect to FIG. 4 below. The computing device 40 comprises a first network interface 43 and a second network interface 44, and a processor 41 coupled to the first and second network interfaces. Computing devices 40 include personal computers, portable computers, and other computing devices. Examples of computing devices 40 include laptop computers, desktop computers, tablets, personal computers, mobile phones, smart cameras, wearable devices, e-reader devices, mp3 players, hard disc drives and other devices containing a memory and a processor, or can be a combination of a plurality of computing devices.

The mobile device 20 can be any type of portable computing device as mentioned above such as a mobile phone, a tablet or a wearable device. The beacon 30 coupled to the mobile device 20 may be a hardware transmitter—for example, a Bluetooth® low energy (LE) device that broadcasts its identifier to nearby portable electronic devices. The technology enables smartphones, tablets and other computing devices to perform actions when in close proximity to the beacon 30. For example, the beacon 30 may act as a wireless access point/node. In some example, the beacon 30 may be incorporated inside the mobile device 20, or attached to the mobile device 20. The mobile device 20 may be running an application that allows a user to interact with the mobile device 20, the authentication server 10 and/or computing device 40. For example, the application may allow the user to authenticate themselves with the authentication server 10. It may also allow the user to enter commands for the authentication server 10, such to provide access to data via issuing tokens and/or to control functionality of the computing device 40, as will be described in more detail below.

The authentication server 10 may be a computer system controlled by a network administrator. For example, it may comprise an automated computer program that sends out a token in response to receiving a request such as a SMS message, a 3G message or a GSM message. In some example, it may be a human operated device that sends out a token in response to receiving a telephone call to request authorisation.

In the example shown, the first network 50 is a short-range radio-frequency network such as a wireless local area network, e.g. a Wi-Fi® network, a Bluetooth® network or such like. The second network 60 is a long-range radio-frequency wireless communication network, such as a cellular telephone network, e.g. using a Global System for Mobile Communications (GSM) or 2G protocol, and/or a Long-Term Evolution (LTE) or 4G protocol, and/or a Universal Mobile Telecommunications System (UMTS) or 3G protocol, and/or 5G protocols. It will be understood, however, that different wireless communication networks using different protocols or technology can be implemented between the computing device 40, the authentication server 10, and the mobile device 20.

The computing device 40 runs software and firmware such as an operating system and applications. The first and second network interfaces are usually the software and/or firmware interfaces of the computing device 40 and provide communication functions such as passing messages, connecting and disconnecting between two or multiple devices or protocol layers in the networks. The first network interface 43 is configured to communicate via the first network

50 and the second network interface 44 is configured to communicate via the second network 60.

In practice, the mobile device 20 and optionally the computing device 40 are configured to periodically send location and/or device information to the authentication server 10. For example, the mobile device 20 is configured to send location and/or device information to the authentication server 10 via the second network 60, and optionally the computing device 40 is configured to send location and/or device information also via the second network 60. In some examples the mobile device 20 and optionally the computing device 40 are also configured to send other information as well, such as information relating to the user of the mobile device 20 and/or computing device 40.

The mobile device 20 is configured to send a request R1 for accessing data in the computing device 40 to the authentication server 10 via the second network 60. It will be understood that in some examples, the mobile device 20 is configured to send the request R1 to the authentication server 10 for access to the data in response to a user of the mobile device 40 authenticating themselves on the mobile device 20, for example by entering a username and password. The authentication server 10 is configured to receive the request R1 and send a first token T1 back to the mobile device 20 over the second network 60.

The mobile device 20 is configured to obtain the first token T1 from the authentication server 10 and then the beacon 30 coupled to the mobile device 20 is configured to broadcast the first token T1 to the nearby computing device 40 over the first network 50, which may, for example, be a Bluetooth® network. In the example shown in FIG. 1a, the beacon 30 is configured to periodically and passively advertise and send the first token T1 to the computing device 40 in proximity to the beacon 30 over a Bluetooth® network without a secure connection. The computing device 40 is configured to receive the first token T1 over the first network 50 from the beacon 30 coupled to the mobile device 20.

Although in the example shown in FIG. 1 the beacon 30 is configured to periodically and passively advertise and send the first token T1 to the computing device 40 in proximity to the beacon 30 without a secure connection, it will be appreciated that in other examples the computing device 40 is configured to receive the first token T1 over a secure connection which may be established between the mobile device 20 and the computing device 40, for example, over a Bluetooth® pairing or encrypted connection. In such examples the token may not be broadcast from the beacon 30. Additionally and/or alternatively, in some examples the computing device 40 may be configured to pull the tokens that are periodically put/updated in the beacon 30 (e.g. by the mobile device 20).

After obtaining the first token T1 from the beacon 30, the computing device 40 receives a second token T2 from the authentication server 10 over the second network 60. In some examples, the authentication server 10 is configured to send the second token T2 to the computing device 40 in response to sending the first token T1 to the mobile device 20. It will be appreciated that in some examples the connection between the computing device 40 and the authentication server 10 may be a secure connection, but that in other examples it may be an unsecure connection.

In some examples the authentication server 10 is configured to send the first token T1 to the mobile device 20 and the second token T2 to the computing device 40 in response to receiving the request R1 over the second network 60. In some examples it will be appreciated that the authentication server 10 may send the first token T1 to the mobile device 20 and the second token T2 to the computing device 40 at the same time.

However, it will be appreciated that the authentication server 10 may not need to wait for a request R1 to send the first and/or second tokens T1, T2. For example, the authentication server 10 may be configured to send at least one of the first and/or second tokens T1, T2 unprompted, for example on a periodic basis (which may, for example, be set by a security policy as described below). This means that the authentication server 10 can send new tokens as and when conditions dictate—for example if there has been a security breach, or to ensure that only "fresh" tokens are being used to access data.

In some examples the authentication server 10 may be configured to send the first and/or second tokens T1, T2 in response to the location and/or device information changing—for example, the authentication server 10 may be configured to process the location and/or device information and make a determination about properties (such as the location) of at least one of the mobile device 20 and the computing device 40. In the event that it is determined that this information has changed (for example, the location of the mobile device 20 and/or the computing device 40 has moved from or to a selected location such as a "secure location", for example to a selected or designated place of work), the authentication server 10 may be configured to send the first and/or second tokens T1, T2. In some examples the authentication server 10 may be configured to only send the first and/or second tokens T1, T2 if the mobile device 20 and the computing device 40 share at least some information in common, for example if they are both in proximity to each other at the same location, for example if they are both at the selected "secure location".

After receiving the first token T1 and the second token T2, the processor 41 of the computing device 40 is configured to compare the two tokens T1 and T2 and make a determination whether to provide access to the data based on the result of the comparison. For example, the processor 41 provides access to the data when the first token T1 and second token T2 are identical. Additionally and alternatively, the processor 41 provides access to the data if the first token T1 is related to the second token T2, for example, if the first token T1 is a mathematical function of the second token T2 or vice-versa, or if the token is linked to the user e.g. to the user's account.

In some examples the authentication server 10 is also configured to send a security policy with at least one of the tokens T1, T2, for example to the computing device 40 with the second token T2. The security policy may, for example, determine things such as the frequency at which location and/or device information is sent to the authentication server 10 by the mobile device 20 and/or computing device 40, permissions of users of the mobile device 20 and/or computing device 40, where the "secure location" is and/or how it is defined, and/or optionally other things such as the valid lifespan of the tokens T1, T2—for example, the security policy may dictate that the tokens T1, T2 only have a limited lifespan over which they are valid.

In some examples, the processor 41 of the computing device 40 is also coupled to a memory 42, and the data is held on the memory 42. Providing access to data may comprise the computing device 40, for example the processor 41, providing access to at least a portion of the data held on the memory 42. Additionally and/or alternatively, the computing device 40 is configured to send a request to a remote device 100 for access to at least a portion of the data held on the remote device 100. It will be understood that remote device 100 may be the same as the authentication server 10 mentioned above.

In some examples, the request R1 for access to data comprises an identifier, and the identifier provides at least one of (i) information relating to the user of the computing device 40 and/or mobile device 20, (ii) information relating to the computing device 40 and/or mobile device 20, and (iii) information relating to the location of the computing device 40 and/or mobile device 20.

Information relating to the user could include whether or not the user has been authenticated.

Information relating to the location of the computing device 40 and/or mobile device 20 could be a beacon identifier indicating which building/office the computing device 40 and/or mobile device 20 is so that different portions of the data can be made accessible (for example, unlocked) depending on where the user is. For example, the location could be inferred from the beacon identifier by performing a lookup operation in a database of known locations for each beacon. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation in a database of known locations for various cell mast information.

Information relating to the computing and/or mobile device 40, 20 could include host computer information such as a MAC address, an IP address, a wireless network ID, time information, and GPS information. In some examples the identifier may comprise the device and/or location information that is periodically sent to the authentication server 10.

In some examples the computing device 40 is configured to determine a portion of the data to provide access to based on the identifier. Optionally in some examples, the authentication server 10 is configured to create the first and second tokens T1 and T2 based on the identifier. For example, the first and second tokens may be the identifier itself. Additionally and/or alternatively, the first and second tokens may be created using the identifier and/or other information (e.g. time of the request, device and/or location information).

It will be understood that in some examples the first and second tokens may be created by combining (e.g. linking or attaching) the identifier and other information together. Therefore, the computing device 40 may be able to read the identifier from the first and second tokens directly, or decompose the identifier from the first and second tokens. Additionally and/or alternatively, the computing device 40 is configured to determine a portion of the data based on least one of the received first and second tokens T1 and T2. For example, the computing device 40 reads the identifier providing the information (such as the user's profile and permission level) relating to the user of the computing device 40 based on least one of the received first and second tokens T1 and T2.

In some examples the computing device 40 only makes accessible (for example, unlocks) the portion of the data that the user is authorised to have access to. In some examples, the computing device 40 makes accessible the portion of the data by selecting a map of the data store on the memory 42. Additionally and/or alternatively, the computing device 40 makes accessible the portion of the data by downloading the data from a remote device. For example, in order to provide access to data, the computing device 40 may be first configured to send a request to a remote device, such as the authentication server 10, for access to the data to download the data from the remote device.

The processor 41 of the computing device 40 may be configured to provide access to data by unlocking the data. For example, the data may be encrypted, and the processor 41 of the computing device 40 is configured to provide access to data by decrypting the data based on at least one of the first and second tokens. For example, the data is protected by a password and the processor 41 is configured to read the password from at least one of the first and second tokens.

In some examples, at least one of the computing device 40 and the mobile device 20 is configured to send a request for access to the data to the authentication server 10 in response to at least the other of the computing device 40 and the mobile device 20 approving the request. For example, the user approves the request for access to the data on the computing device 40, and then the mobile device 20 used by the same user automatically sends a request to the authentication server 10. FIG. 1b is a sequence diagram of a method for use with the system of FIG. 1a. As can be seen in FIG. 1b, the method of controlling the accessibility of data by a computing device 40, comprises sending a request R1 for access to data to an authentication server 10; and receiving a first token T1 from the authentication server 10 via a first network 50, and a second token T2 from the authentication server 10 via a second network 60; and determining whether to provide access to the data based on a comparison of the first token T1 and the second token T2.

In more detail, the mobile device 20 periodically sends 101 location and/or device information to the authentication server 10 via the second network 60. The computing device 40 also periodically sends 102 location and/or device information to the authentication server 10 via the first network 50. The frequency of the sending of this information may be set by a security policy determined by the authentication server 10, for example a security policy that may be transmitted from the authentication server 10 with the first and/or second tokens T1, T2.

The user of the computing device 40 uses the mobile device 20 to send 103 a request R1 to the authentication server 10 via the second network 60. It will be understood that in some examples, the mobile device 20 sends the request R1 to the authentication server 10 for access to the data in response to a user of the mobile device 20 authenticating themselves on the mobile device 20, although in other examples it will be understood that the request R1 may be sent automatically, for example the mobile device 20 may be configured to send the request R1 periodically (for example on a frequency that is determined by a security policy), and/or if the mobile device 20 determines that it is at a selected location (such as the "secure location"), for example by determining that it is near the beacon 30. The authentication server 10 receives the request R1 and sends 104 a first token T1 back to the mobile device 20 over the second network 60.

In the example shown in FIG. 1b, after the mobile device 20 receives the first token T1 from the authentication server 10, it uses the beacon 30 coupled to the computing device 40 to broadcast 105 the first token R1 to the computing device 40 via the first network 50 which in this example is a Bluetooth® network.

As shown in FIG. 1b, the authentication server also sends 106 a second token T2 to the computing device 40, such that the computing device 40 receives the first token T1 from the mobile device 20 and also (in some examples, simultaneously) receives a second token T2 from the authentication server 10. In some examples the authentication server 10 sends 106 the second token T2 to the computing device 40, optionally in response to sending 104 the first token T1 to the mobile device 20, and/or in response to receiving the request R1 from the mobile device 20.

In some examples the authentication server 10 also sends a security policy with the second token T2. The security policy may, for example, determine things such as the frequency at which location and/or device information is sent to the authentication server 10 by the mobile device 20 and/or computing device 40, permissions of users of the mobile device 20 and/or computing device 40, where the "secure location" is and/or how it is defined, and/or optionally other things such as the valid lifespan of the tokens T1, T2—for example, the security policy may dictate that the tokens T1, T2 only have a limited lifespan over which they are valid.

After receiving the first token T1 and the second token T2, the processor 41 of the computing device 40 performs 107 a cross-check such as a comparison of the two tokens T1 and T2 and makes a determination as to whether to provide access to the data based on the result of the comparison. In some examples the determination may also be based on the security policy. For example, the processor 41 provides access to the data when the first token T1 and second token T2 are identical. Alternatively, the processor 41 checks if the first token T1 is related to the second token T2, for example if the first token T1 is a mathematical function of the second token T2 or vice-versa, or if the token is linked to the user e.g. to the user's account.

In some examples, the request R1 for access to data comprises an identifier, and the identifier provides at least one of (i) information relating to the user of the computing device 40 and/or mobile device 20, (ii) information relating to the computing device 40 and/or mobile device 20, and (iii) information relating to the location of the computing device 40 and/or mobile device 20.

Information relating to the user could include whether or not the user has been authenticated. Information relating to the location of the computing device 40 and/or mobile device 20 could be a beacon identifier indicating which building/office the computing device 40 and/or mobile device 20 is so that different portions of the data can be made accessible (for example, unlocked) depending on where the user is. For example, the location could be inferred from the beacon—for example by performing a lookup operation in a database of known locations for each beacon. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation in a database of known locations for various cell masts.

Information relating to the computing and/or mobile device 40, 20 could include host computer information such as a MAC address, an IP address, a wireless network ID, time information, and GPS information.

In some examples the identifier may comprise the device and/or location information that is periodically sent to the authentication server 10. In some examples the computing device 40 determines a portion of the data to provide access to based on the identifier. In other examples the authentication server 10 may determine a portion of the data to provide access to based on the identifier and, as will be described below, the tokens T1, T2 sent by the authentication server 10 may be created based on this determination to provide access to only the determined portion of data.

In some examples the computing device 40 determines a portion of the data to provide access to based on the identifier. Optionally in some examples, the authentication server 10 creates the first and second tokens based on the identifier. For example, the first and second tokens may be the identifier itself. Additionally and/or alternatively, the first and second tokens may be created using the identifier and other information (e.g. time of the request).

It will be understood that in some examples the first and/or second tokens may be created by combining (e.g. linking or attaching) the identifier and other information together. Therefore, the computing device 40 may be able to read the identifier from the first and second tokens directly, or decompose the identifier from the first and second tokens. Additionally and/or alternatively, the computing device 40 determines a portion of the data to make accessible based on least one of the received first and second tokens. For example, the computing device 40 reads the identifier providing the information (such as the user's profile and permission level) relating to the user of the computing device 40 based on least one of the received first and second tokens T1 and T2.

In some examples the computing device 40 only makes accessible the portion of the data that the user is authorised to have access to. In some examples, the computing device 40 makes accessible the portion of the data by selecting a map of the data store on the memory 42. Additionally and/or alternatively, the computing device 40 makes accessible the portion of the data by downloading the data after the request is accepted.

The processor 41 of the computing device 40 may be configured to provide access to data by unlocking the data. For example, the data may be encrypted, and the processor 41 of the computing device 40 provides access to data by decrypting the data based on at least one of the first and second tokens. For example, the data is protected by a password and the processor 41 is configured to read the password from at least one of the first and second tokens.

In some examples, the computing device 40 provides access to at least a portion of the data held on a memory of the computing device 40. Alternatively, the computing device 40 sends a request to a remote device for access to at least a portion of the data held on a remote device. Here, the remote device may be the same as the authentication server 10 mentioned above, or it may be separate, for example, the remote device may be a hard disk at a distance while the authentication server 10 is a request-response computer program in the cloud.

In some examples, the method may comprise sending the request to the authentication server 10 for access to the data in response to a user of the computing device 40 authenticating themselves on at least one of (i) the computing device 40 and (ii) a mobile device 20 in communication with the computing device 40 and (iii) a mobile device 20 linked to an account operating on the computing device 40.

In some examples it will be appreciated that sending a request for access to data may comprise at least one of (i) a mobile device 20 in communication with the computing device 40 sending a request for access to data or (ii) a mobile device 20 linked to an account operating on the computing device 40 sending a request for access to data. For example, a mobile device 20 communicates with the computing device 40 and sends a request for access to data to the authentication server 10. Alternatively, a mobile device 20 linked to an account operating on the computing device 40 (same user using the computing device 40 and mobile device 20) sends a request for access to data to the authentication server 10.

In some examples, the mobile device 20 sends a request for access to the data to the authentication server 10 in response to at least the other of the computing device 40 and the mobile device 20 approving the request. For example, the user approves the request for access to the data on the computing device 40, and then the mobile device 20 used by the same user automatically sends a request to the authentication server 10.

In some examples the authentication server 10 can "wipe" tokens T1, T2 from any device (such as mobile device 20, beacon 30 and/or computing device 40) whenever needed without having to wait for a request. For example if any of the devices report a location outside a selected "secure location" the authentication server 10 can update the tokens T1, T2 to immediately stop device feature access: it does not need a request. In some examples, the optional security policy that may be sent with the first and/or second tokens T1, T2 may dictate the lifespan of the tokens T1, T2 and may delete or wipe the tokens T1, T2 once this lifespan has expired.

FIG. 2 shows a second example of a system 02 for controlling the accessibility of data. It will be understood that the example shown in FIG. 2 shows many features in common with the example shown in FIG. 1 and functionality described with reference to FIG. 1 can be applied to FIG. 2 and vice-versa. As shown in FIG. 2a, the system 02 comprises a computing device 40, a mobile device 20, a beacon 30, an authentication server 10, a first network 50 between the computing device 40 and the beacon 30, and a second network 60 between the authentication server 10 and the computing device 40, a third network 70 communicates between the authentication server 10 and the mobile device 20 and a network 80 communicates between the mobile device 20 and the beacon 30. The first network 50 or the network 80 includes a short-range radio-frequency network such as a wireless local area network, e.g. a Wi-Fi® network, a Bluetooth® network or such like. The second network 60 or the third network 70 includes a long-range radio-frequency wireless communication network, such as a cellular telephone network, e.g. using a Global System for Mobile Communications (GSM) or 2G protocol, and/or a Long-Term Evolution (LTE) or 4G protocol, and/or a Universal Mobile Telecommunications System (UMTS) or 3G protocol, and/or 5G protocols. Indeed, different wireless communication networks using different protocols or technology can be implemented between the computing device 40, the authentication server 10, the beacon 30 and the mobile device 20. The beacon 30, for example, uses Bluetooth® low energy proximity sensing to transmit information and enables the computing device 40 to perform actions when in close proximity to the beacon 30.

In practice, the mobile device 20 and optionally the computing device 40 are configured to periodically send location and/or device information to the authentication server 10. For example, the mobile device 20 is configured to send location and/or device information to the authentication server 10 via the third network 70, and optionally the computing device 40 is configured to send location and/or device information via the second network 60. In some examples the mobile device 20 and optionally the computing device 40 are also configured to send other information as well, such as information relating to the user of the mobile device 20 and/or computing device 40.

The mobile device 20 is configured to send a request R1 for accessing data in the computing device 40 to the authentication server 10 via the third network 70. It will be understood that in some examples, the mobile device 20 is configured to send the request R1 to the authentication server 10 for access to the data in response to a user of the mobile device 40 authenticating themselves on the mobile device 20, for example by entering a username and password. The authentication server 10 is configured to receive the request R1 and send a first token T1 back to the mobile device 20 over the third network 70. The mobile device 20 is configured to obtain the first token T1 from the authentication server 10 and sends the token to the beacon 30 (for example, via the first network 50) which is configured to broadcast the first token T1 to the nearby computing device 40 over the first network 50 such as a Bluetooth® network. For example, the beacon 30 is configured to periodically and passively advertise and send tokens to the computing device 40 in proximity to the beacon 30 without a secure connection. The computing device 40 is configured to receive the first token T1 over the first network 50 from the beacon 30.

Although in the example shown in FIG. 2a the beacon 30 is configured to periodically and passively advertise and send the first token T1 to the computing device 40 in proximity to the beacon 30 over the first network 50 without a secure connection, it will be appreciated that in other examples the computing device 40 is configured to receive the first token T1 over a secure connection which may be established between the mobile device 20 and the computing device 40, for example, over a Bluetooth® pairing or encrypted connection. In such examples the token may not be broadcast from the beacon 30. Additionally and/or alternatively, in some examples the computing device 40 may be configured to pull the tokens that are periodically put/updated in the beacon 30 (e.g. by the mobile device 20).

After obtaining the first token T1 from the beacon 30, the computing device 40 receives a second token T2 from the authentication server 10 over the second network 60. In some examples, the authentication server 10 is configured to send the second token T2 to the computing device 40 in response to sending the first token T1 to the mobile device 20.

In some examples the authentication server 10 is configured to send the first token T1 to the mobile device 20 and the second token T2 to the computing device 40 in response to receiving the request R1 over the third network 70. In some examples the authentication server 10 may be configured to send the second token T2 to the computing device 40 over a secure connection. However, in some examples it will be appreciated that the authentication server 10 may not need to wait for a request R1 to send the first and/or second tokens T1, T2. For example, the authentication server 10 may be configured to send at least one of the first and/or second tokens T1, T2 unprompted, for example on a periodic basis (which may, for example, be set by a security policy). In some examples the authentication server 10 may be configured to send the first and/or second tokens T1, T2 in response to the location and/or device information changing—for example, the authentication server 10 may be configured to process the location and/or device information and make a determination about properties (such as the location) of at least one of the mobile device 20 and the computing device 40. In the event that it is determined that this information has changed (for example, the location of the mobile device 20 and/or the computing device 40 has moved from or to a selected location such as a "secure location", for example to a selected or designated place of work), the authentication server 10 may be configured to send the first and/or second tokens T1, T2. In some examples the authentication server 10 may be configured to only send the first and/or second tokens T1, T2 if the mobile device 20 and the computing device 40 share at least some information in common, for example if they are both in proximity to each other at the same location, for example if they are both at the selected "secure location".

After receiving the first token T1 and the second token T2, the processor 41 of the computing device 40 is configured to compare the two tokens T1 and T2 and makes a determination whether to provide access to the data based on the result of the comparison. For example, the processor 41 provides access to the data when the first token T1 and second token T2 are identical. Alternatively, the processor 41 provides access to the data if the first token T1 is related to the second token T2, for example, if the first token T1 is a mathematical function of the second token T2 or vice-versa, or if the token is linked to the user e.g. to the user's account.

In some examples the authentication server 10 is also configured to send a security policy with at least one of the tokens T1, T2, for example to the computing device 40 with the second token T2. The security policy may, for example, determine things such as the frequency at which location and/or device information is sent to the authentication server 10 by the mobile device 20 and/or computing device 40, permissions of users of the mobile device 20 and/or computing device 40, where the "secure location" is and/or how it is defined, and/or optionally other things such as the valid lifespan of the tokens T1, T2—for example, the security policy may dictate that the tokens T1, T2 only have a limited lifespan over which they are valid.

As described above with reference to FIG. 1, the processor 41 of the computing device 40 is also coupled to a memory 42, and the data is held on the memory 42 and the processor 41 of the computing device 40 is configured to provide access to at least a portion of the data held on the memory 42. Additionally and/or alternatively, the computing device 40 is configured to send a request to a remote device 100 for access to at least a portion of the data held on the remote device 100. It will be understood that remote device may be the same as the authentication server 10 mentioned above.

As with the example in FIG. 1, the request R1 for access to data may comprise an identifier, and the identifier provides at least one of (i) information relating to the user of the computing device 40 and/or mobile device 20, (ii) information relating to the computing device40 and/or mobile device 20, and (iii) information relating to the location of the computing device 40 and/or mobile device 20.

Information relating to the user could include whether or not the user has been authenticated.

Information relating to the location of the computing device 40 and/or mobile device 20 could be a beacon identifier indicating which building/office the computing device 40 and/or mobile device 20 is so that different portions of the data can be made accessible (for example, unlocked) depending on where the user is. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation.

Information relating to the computing device 40 and/or mobile device 20 could include host computer information such as a MAC address, an IP address, a wireless network ID, time information, and GPS information.

Based on the identifier, the computing device 40 is configured to determine a portion of the data to provide access to. Optionally in some examples, the authentication server 10 is configured to create the first and second tokens T1 and T2 based on the identifier. For example, the first and second tokens may be the identifier itself. Additionally and/or alternatively, the first and second tokens may be created using the identifier and other information (e.g. time of the request).

It will be understood that in some examples the first and second tokens may be created by combining (e.g. linking or attaching) the identifier and other information together. Therefore, the computing device 40 may be able to read the identifier from the first and second tokens directly, or decompose the identifier from the first and second tokens. Additionally and/or alternatively, the computing device 40 is configured to determine a portion of the data based on at least one of the received first and second tokens T1 and T2. For example, the computing device 40 reads the identifier providing the information (such as the user's profile and security permission level) relating to the user of the computing device 40 based on least one of the received first and second tokens T1 and T2.

In some examples the computing device 40 only makes accessible (for example, unlocks) the portion of the data that the user is authorised to have access to. In some examples, the computing device 40 makes accessible the portion of the data by selecting a map of the data store on the memory 42. Additionally and/or alternatively, the computing device 40 makes accessible the portion of the data by downloading the data from a remote device. As with the example described above with reference to FIG. 1, in the example shown in FIG. 2, in order to provide access to data, the computing device 40 may be first configured to send a request to a remote device, such as the authentication server 10 for access to the data to download the data from the remote device.

The processor 41 of the computing device 40 may be configured to provide access to data by unlocking the data. For example, the data may be encrypted, and the processor 41 of the computing device 40 may be configured to provide access to data by decrypting the data based on at least one of the first and second tokens. For example, the data is protected by a password and the processor 41 is configured to read the password from at least one of the first and second tokens.

In some examples, at least one of the computing device 40 and the mobile device 20 is configured to send a request for access to the data to the authentication server 10 in response to at least the other of the computing device and the mobile device approving the request. For example, the user approves the request for access to the data on the computing device 40, and then the remote device 20 used by the same user automatically sends a request to the authentication server 10.

FIG. 2_b_ is a sequence diagram of a method for use with the system of FIG. 2_a_. In the example shown, the mobile device 20 periodically sends 201 location and/or device information to the authentication server 10 via the second network 60. The computing device 40 also periodically sends 202 location and/or device information to the authentication server 10 via the first network 50. The frequency of the sending of this information may be set by a security policy determined by the authentication server 10.

The user of the computing device 40 uses the mobile device 20 to send 203 a request R1 to an authentication server 10. The request R1 may be sent automatically (for example, based on a security policy), for example the mobile device 20 may be configured to send the request R1 periodically (for example on a frequency that is determined by a security policy), and/or if the mobile device 20 determines that it is at a selected location (such as the "secure location"), for example by determining that it is near the beacon 30. The authentication server 10 receives the request R1 and sends 204 a first token T1 back to the mobile device 20. After the mobile device 20 receives the first token T1 from the authentication server 10, it sends 205 the first token T1 to the beacon 30. Then the beacon 30 broadcasts 206 the first token R1 to the computing device 40.

As shown in FIG. 2*b*, the computing device 40 receives the first token T1 from the beacon 30. The authentication server 10 also sends 207 the second token T2 to the computing device 40, optionally in response to sending 207 the first token T1 to the mobile device 20, and/or in response to receiving the request R1 from the mobile device 20.

After receiving the first token T1 and the second token T2, the processor 41 of the computing device 40 performs 208 a cross-check such as a comparison on the two tokens T1 and T2 and makes a determination whether to provide access to the data based on the result of the comparison. In some examples the determination may also be based on the security policy. For example, the processor 41 provides access to the data when the first token T1 and second token T2 are identical. Alternatively, the processor 41 checks if the first token T1 is related to the second token T2, for example if the first token T1 is a mathematical function of the second token T2 or vice-versa, or if the token is linked to the user e.g. to the user's account.

The request R1 for access to data may comprise an identifier, and the identifier provides at least one of (i) information relating to the user of the computing device 40 and/or mobile device 20, (ii) information relating to the computing device 40 and/or mobile device 20, and (iii) information relating to the location of the computing device 40 and/or mobile device 20.

Information relating to the user could include whether or not the user has been authenticated.

Information relating to the location of the computing device 40 and/or mobile device 20 could be a beacon identifier indicating which building/office the computing device 40 and/or mobile device 20 is so that different portions of the data can be made accessible (for example, unlocked) depending on where the user is. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation.

Information relating to the computing device 40 and/or mobile device 20 could include host computer information such as a MAC address, an IP address, a wireless network ID, time information, and GPS information. In some examples the identifier may comprise the information that is periodically sent to the authentication server 10.

In some examples the computing device 40 determines a portion of the data to provide access to based on the identifier. In other examples the authentication server 10 may determine a portion of the data to provide access to based on the identifier and, as will be described below, the tokens T1, T2 sent by the authentication server 10 may be created based on this determination to provide access to only the determined portion of data.

Optionally, in some examples the authentication server 10 creates the first and/or second tokens T1 and T2 based on the identifier. For example, the first and second tokens may be the identifier itself. Additionally and/or alternatively, the first and second tokens may be created using the identifier and other information (e.g. time of the request). It will be understood that in some examples the first and second tokens may be created by combining (e.g. linking or attaching) the identifier and other information together. Therefore, the computing device 40 may be able to read the identifier from the first and second tokens directly, or decompose the identifier from the first and second tokens. Additionally and/or alternatively, the computing device 40 determines a portion of the data based on least one of the received first and second tokens T1 and T2. For example, the computing device 40 reads the identifier providing the information (such as the user's profile and security permission level) relating to the user of the computing device 40 based on least one of the received first and second tokens T1 and T2.

In some examples, the computing device 40 only makes accessible (for example, unlocks) the portion of the data that the user is authorised to have access to. In some examples, the computing device 40 makes accessible the portion of the data by selecting a map of the data store on the memory 42. Additionally and/or alternatively, the computing device 40 makes accessible the portion of the data by downloading the data.

The processor 41 of the computing device 40 may be configured to provide access to data by unlocking the data. For example, the data may be encrypted, and the processor 41 of the computing device 40 provides access to data by decrypting the data based on at least one of the first and second tokens. For example, the data is protected by a password and the processor 41 is configured to read the password from at least one of the first and second tokens.

In some examples, the computing device 40 provides access to at least a portion of the data held on a memory of the computing device 40. Alternatively, the computing device 40 sends a request to a remote device for access to at least a portion of the data held on a remote device. It will be appreciated that the remote device may be the same as the authentication server 10 mentioned above, or it may be separate, for example, the remote device may be a hard disk at a distance while the authentication server 10 is a request-response computer program in the cloud.

In some examples, the method may comprise sending the request to the authentication server 10 for access to the data in response to a user of the computing device 40 authenticating themselves on at least one of (i) the computing device 40 and (ii) a mobile device 20 in communication with the computing device 40 and (iii) a mobile device 20 linked to an account operating on the computing device 40.

In some examples it will be appreciated that sending a request for access to data may comprise at least one of (i) a mobile device 20 in communication with the computing device 40 sending a request for access to data or (ii) a mobile device 20 linked to an account operating on the computing device 40 sending a request for access to data. For example, a mobile device 20 communicates with the computing device 40 and sends a request for access to data to the authentication server 10. Alternatively, a mobile device 20 linked to an account operating on the computing device 40 (same user using the computing device 40 and mobile device 20) sends a request for access to data to the authentication server 10.

In some examples, the mobile device 20 sends a request for access to the data to the authentication server 10 in response to at least the other of the computing device 40 and the mobile device 20 approving the request. For example, the user approves the request for access to the data on the computing device 40, and then the mobile device 20 used by the same user automatically sends a request to the authentication server 10.

FIG. 3a is an illustration of a third example of a system 03 and shares similarity with the system shown in FIG. 1a and FIG. 2a. The system 03 comprises a computing device 40, a beacon 30, an authentication server 10, a first network 50 between the computing device 40 and the beacon 30, and a second network 60 between the authentication server 10 and the computing device 40, and a third network 70 between the authentication server 10 and the beacon 30. The first network 50 includes a short-range radio-frequency network such as a wireless local area network, e.g. a Wi-Fi® network, a Bluetooth® network or such like. The second network 60 or the third network 70 may be a long-range radio-frequency wireless communication network, such as a cellular telephone network, e.g. using a Global System for Mobile Communications (GSM) or 2G protocol, and/or a Long-Term Evolution (LTE) or 4G protocol, and/or a Universal Mobile Telecommunications System (UMTS) or 3G protocol, and/or 5G protocols. Indeed, different wireless communication networks using different protocols or technology can be implemented between the computing device 40, the authentication server 10, and the beacon 30. The beacon 30, for example, uses Bluetooth® low energy proximity sensing to transmit information and enables the computing device 40 to perform actions when in close proximity to the beacon 30.

In practice, the computing device 40 and optionally beacon 30 are configured to periodically send information to the authentication server 10. For example, the beacon 30 may be configured to send information relating to devices in range and/or connected to the beacon 30 to the authentication server 10 via the third network 70, and optionally the computing device 40 is configured to send location and/or device information via the second network 60. In some examples the computing device 40 is also configured to send other information as well, such as information relating to the user of the computing device 40.

The computing device 40 is configured to communicate with the beacon 20 and then the beacon 20 is configured to send a request R1 for accessing data in the computing device 40 to the authentication server 10 via the third network 70. The authentication server 10 is configured to receive the request R1 and send a first token T1 back to the beacon 30 over the third network 70. The beacon 30 is configured to obtain the first token T1 from the authentication server 10 via the third network 70. The beacon 30 is configured to broadcast the first token T1 to the nearby computing device 40 over the first network 50 such as a Bluetooth® network. For example, the beacon 30 is configured to periodically and passively advertise and send tokens to the computing device 40 in the proximity to the beacon 30 without a secure connection. The computing device 40 is configured to receive the first token T1 over the first network 50 from the beacon 30.

Although in the example shown in FIG. 3a the beacon 30 is configured to periodically and passively advertise and send the first token T1 to the computing device 40 in proximity to the beacon 30 over the first network 50 without a secure connection, it will be appreciated that in other examples the computing device 40 is configured to receive the first token T1 over a secure connection which may be established between the mobile device 20 and the computing device 40, for example, over a Bluetooth® pairing or encrypted connection. In such examples the token may not be broadcast from the beacon 30. Additionally and/or alternatively, in some examples the computing device 40 may be configured to pull the tokens that are periodically put/updated in the beacon 30.

After obtaining the first token T1 from the beacon 30, the computing device 40 receives a second token T2 from the authentication server 10 over the second network 60. In some examples, the authentication server 10 is configured to send the second token T2 in response to sending the first token T1 to the beacon 30.

The authentication server 10 is configured to send the second token T2 to the computing device 40 over the second network 60. In some examples it will be appreciated that the authentication server 10 may send the first token T1 to the beacon 30 and the second token T2 to the computing device 40 at the same time. However, in some examples it will be appreciated that the authentication server 10 may not need to wait for a request R1 to send the first and/or second tokens T1, T2. For example, the authentication server 10 may be configured to send at least one of the first and/or second tokens T1, T2 unprompted, for example on a periodic basis (which may, for example, be set by a security policy). In some examples the authentication server 10 may be configured to send the first and/or second tokens T1, T2 in response to the location and/or device information changing—for example, the authentication server 10 may be configured to process the location and/or device information and make a determination about properties (such as the location) of the computing device 40. In the event that it is determined that this information has changed (for example, the location of the computing device 40 has moved from or to a selected location such as a "secure location", for example to a selected or designated place of work), the authentication server 10 may be configured to send the first and/or second tokens T1, T2. In some examples the authentication server 10 may be configured to only send the first and/or second tokens T1, T2 if the computing device 40 is in proximity and communicating with the beacon 30. Because the location of the beacon 30 is known, if it is determined that the computing device 40 is communicating with the beacon 30, the location of the computing device 40 can also be determined.

After receiving the first token T1 and the second token T2, the processor 41 of the computing device 40 is configured to compare the two tokens T1 and T2 and makes a determination whether to provide access to the data based on the result of the comparison. For example, the processor 41 provides access to the data when the first token T1 and second token T2 are identical. Alternatively, the processor 41 provides access to the data if the first token T1 is related to the second token T2, for example, if the first token T1 is a mathematical function of the second token T2 or vice-versa, or if the token is linked to the user e.g. to the user's account.

In some examples the authentication server 10 is also configured to send a security policy with at least one of the tokens T1, T2, for example to the computing device 40 with the second token T2. The security policy may, for example, determine things such as the frequency at which location and/or device information is sent to the authentication server 10 by the computing device 40, permissions of users of the computing device 40, where the "secure location" is and/or how it is defined, and/or optionally other things such as the valid lifespan of the tokens T1, T2—for example, the security policy may dictate that the tokens T1, T2 only have a limited lifespan over which they are valid.

As with the example described above with reference to FIG. 1 and FIG. 2, in the example shown in FIG. 3, the processor 41 of the computing device 40 is also coupled to a memory 42, and the data is held on the memory 42 and the processor 41 of the computing device 40 is configured to provide access to at least a portion of the data held on the memory 42. Additionally and/or alternatively, the computing device 40 is configured to send a request to a remote device 100 for access to at least a portion of the data held on the remote device 100. It will be understood that remote device 100 may be the same as the authentication server 10 mentioned above.

The request R1 for access to data may comprise an identifier, and the identifier provides at least one of (i) information relating to the user of the computing device 40, (ii) information relating to the computing device 40, (iii) information relating to the location of the computing device 40 (iv) information relating to devices in range and/or in communication with the beacon 30.

Information relating to the user could include whether or not the user has been authenticated.

Information relating to the location of the computing device 40 could be a beacon identifier indicating which building/office the computing device 40 is so that different portions of the data can be made accessible (for example, unlocked) depending on where the user is. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation.

Information relating to the computing device 40 could include host computer information such as a MAC address, an IP address, a wireless network ID, time information, and GPS information.

Based on the identifier, the computing device 40 may be configured to determine a portion of the data to provide access to. Optionally in some examples, the authentication server 10 is configured to create the first and second tokens T1 and T2 based on the identifier. For example, the first and second tokens may be the identifier itself. Additionally and/or alternatively, the first and second tokens may be created using the identifier and other information (e.g. time of the request). It will be understood that in some examples the first and second tokens may be created by combining (e.g. linking or attaching) the identifier and other information together. Therefore, the computing device 40 may be able to read the identifier from the first and second tokens directly, or decompose the identifier from the first and second tokens. Additionally and/or alternatively, the computing device 40 is configured to determine a portion of the data based on at least one of the received first and second tokens. For example, the computing device 40 reads the identifier providing the information (such as the user's profile and security permission level) relating to the user of the computing device 40 based on at least one of the received first and second tokens T1 and T2.

In some examples the computing device 40 only makes accessible (for example, unlock) the portion of the data that the user is authorised to have access to. In some examples, the computing device 40 makes accessible the portion of the data by selecting a map of the data store on the memory. Additionally and/or alternatively, the computing device 40 makes accessible the portion of the data by downloading the data after the request is accepted.

As with the example described above with reference to FIG. 1 and FIG. 2, in the example shown in FIG. 3, in order to provide access to data, the computing device 40 may be configured to send a request to a remote device, such as the authentication server 10 for access to the data to download the data from the remote device.

The processor 41 of the computing device 40 may be configured to provide access to data by unlocking the data. For example, the data may be encrypted, and the processor 41 of the computing device 40 is configured to provide access to data by decrypting the data based on at least one of the first and second tokens. For example, the data is protected by a password and the processor 41 is configured to read the password from at least one of the first and second tokens.

FIG. 3b is a sequence diagram of a method for use with the system of FIG. 3a. In the example shown, the computing device 40 periodically sends 301 information to the authentication server 10, such as device and/or location information. The beacon 30 may also optionally send 302 information to the authentication server 10. The information may comprise, for example, information relating to the number of connections with the beacon, devices in range of the beacon, the number and/or types of devices in range of the beacon.

The beacon 30 sends 303 a request R1 to the authentication server 10. The request R1 may be sent automatically (for example, based on a security policy), or for example, when the beacon 30 sees that the computing device 40 is in range of the beacon 30 (for example the beacon 30 can communicate with the computing device 40). The authentication server 10 receives the request R1 and sends 304 a first token T1 back to the beacon 30. The beacon 30 receives the first token T1 from the authentication server 10 and then broadcasts 305 the first token R1 to the computing device 40. However, it will be understood that in some examples a request R1 need not be sent at all, and the first token T1 may be sent to the beacon 30 unprompted by the beacon 30 or computing device 40. For example, the authentication server 10 may determine when the first token T1 is to be sent to the beacon 30. This may, for example, be determined by a security policy.

As shown in FIG. 3b, the computing device 40 receives the first token T1 from the beacon 30. The authentication server 10 also sends 307 the second token T2 to the computing device 40 optionally in response to sending 304 the first token T1 to the beacon 30, and/or in response to receiving the request R1 from the beacon 30. As for the first token T1, it will be understood that in some examples the second token T2 may be sent to the computing device 40 unprompted by the beacon 30 or computing device 40. For example, the authentication server 10 may determine when the second token T2 is to be sent to the computing device 40. This may, for example, be determined by a security policy.

After receiving the first token T1 and the second token T2, the processor 41 of the computing device 40 performs 307 a cross-check such as a comparison on the two tokens T1 and T2 and makes a determination whether to provide access to the data based on the result of the comparison. In some examples the determination may also be based on the security policy. For example, the processor 41 provides access to the data when the first token T1 and second token T2 are identical. Alternatively, the processor 41 checks if the first token T1 is related to the second token T2, for example if the first token T1 is a mathematical function of the second token T2 or vice-versa, or if the token is linked to the user e.g. to the user's account.

In some examples the computing device 40 may also be configured to control other components of the computing device 40 based on comparison of the two tokens T1, T2. For example, the computing device 40 may be configured to control a camera, a microphone and a power controller (for example to turn itself off, or to turn components of the computing device 40 on or off). Additionally and/or alternatively, the computing device 40 may be configured to control these components based on a security policy received from the authentication server 10.

As with the example described above with reference to FIG. 1 and FIG. 2, in the example shown in FIG. 3, the request R1 for access to data may comprise an identifier, and the identifier provides at least one of (i) information relating to the user of the computing device 40, (ii) information relating to the computing device 40, and (iii) information relating to the location of the computing device 40.

Information relating to the user could include whether or not the user has been authenticated.

Information relating to the location of the computing device 40 could be a beacon identifier indicating which building/office the computing device 40 is so that different portions of the data can be made accessible (for example, unlocked) depending on where the user is. Information relating to the location could also be based on or inferred from local network information—such as SSID's that can be seen by the computing device and/or mobile device, and/or information such as cell mast information (e.g. eNodeB or gNodeB information)—and the location may be inferred from that information, for example, by performing a lookup operation.

Information relating to the computing device 40 could include host computer information such as a MAC address, an IP address, a wireless network ID, time information, and GPS information. In some examples the identifier may comprise the information that is periodically sent to the authentication server 10. In some examples the computing device 40 determines a portion of the data to provide access to based on the identifier. In other examples the authentication server 10 may determine a portion of the data to provide access to based on the identifier and, as will be described below, the tokens T1, T2 sent by the authentication server 10 may be created based on this determination to provide access to only the determined portion of data.

Based on the identifier, the computing device 40 may determine a portion of the data to provide access to. Optionally in some examples, the authentication server 10 creates the first and second tokens based on the identifier. For example, the first and second tokens may be the identifier itself. Additionally and/or alternatively, the first and second tokens may be created using the identifier and other information (e.g. time of the request).

It will be understood that in some examples the first and second tokens may be created by combining (e.g. linking or attaching) the identifier and other information together. Therefore, the computing device 40 may be able to read the identifier from the first and second tokens directly, or decompose the identifier from the first and second tokens.

Additionally and/or alternatively, the computing device 40 determines a portion of the data based on least one of the received first and second tokens. For example, the computing device 40 reads the identifier providing the information (such as the user's profile and permission level) relating to the user of the computing device 40 based on least one of the received first and second tokens T1 and T2.

In some examples the computing device 40 only makes accessible the portion of the data that the user is authorised to have access to. In some examples, the computing device 40 makes accessible the portion of the data by selecting a map of the data store on the memory 42. Additionally and/or alternatively, the computing device 40 makes accessible the portion of the data by downloading the data.

The processor 41 of the computing device 40 may be configured to provide access to data by unlocking the data. For example, the data may be encrypted, and the processor 41 of the computing device 40 provides access to data by decrypting the data based on at least one of the first and second tokens. For example, the data is protected by a password and the processor 41 is configured to read the password from at least one of the first and second tokens.

The computing device 40 may provide access to at least a portion of the data held on a memory of the computing device 40. Alternatively, the computing device 40 sends a request to a remote device for access to at least a portion of the data held on a remote device. It will be appreciated that the remote device may be the same as the authentication server 10 mentioned above, or it may be separate, for example, the remote device may be a hard disk at a distance while the authentication server 10 is a request-response computer program in the cloud.

In some examples the authentication server 10 can "wipe" tokens T1, T2 from any device (such as beacon 30 and/or computing device 40) whenever needed without having to wait for a request. For example if the computing device 40 report a location outside a selected "secure location" the authentication server 10 can update the tokens T1, T2 to immediately stop device feature access: it does not need a request. In some examples, the optional security policy that may be sent with the first and/or second tokens T1, T2 may dictate the lifespan of the tokens T1, T2 and may delete or wipe the tokens T1, T2 once this lifespan has expired.

FIG. 4 is a functional block diagram of an example computing device 40 for use with the system and method of any of FIGS. 1 to 3 and FIGS. 7 to 8.

The computing device 40 runs software and firmware such as an operating system and applications. As shown in FIG. 4, the computing device 40 comprises a first network interface 43 and a second network interface 44, and a processor 41 coupled to the first network interface 43 and the second network interface 44. In the example shown in FIG. 4, the processor 41 is coupled to an optional memory 42, and the data which access is being provided is held on the memory 42.

The processor 41 is configured to operate the first network interface 43 and the second network interface 44. Optionally, the processor 41 is configured to send a request to a remote device 100 for access to at least a portion of the data held on the remote device 100.

The first network interface 43 and second network interface 44 are configured to provide communication functions such as passing messages, connecting and disconnecting between two or multiple devices or protocol layers in the networks. For example in the example as shown in FIG. 4, the processor 41 is configured to operate the second network interface 44 to communicate with an independent beacon 30.

It will be appreciated that the first network interface 43 and the second network interface 44 comprise antennas suitable for use in a short-range radio-frequency network such as a wireless local area network, e.g. a Wi-Fi network, a Bluetooth® network or such like, as well as a long-range radio-frequency wireless communication network, such as a cellular telephone network, e.g. using a Global System for Mobile Communications (GSM) or 2G protocol, and/or a Long-Term Evolution (LTE) or 4G protocol, and/or a Universal Mobile Telecommunications System (UMTS) or 3G protocol, and/or 5G protocols. It will be understood, however, that, in some embodiments, the first network interface 43 and the second network interface 44 supports more than one of these types of communication at once.

In some examples it will be appreciated that the computing device 40 may comprise other components, such as a camera, a microphone and a power controller. In some examples it will be appreciated that the computing device 40 may be configured to also control one or all of these components in addition to or instead of access to data on the memory based on a determination and comparison of the first and second tokens T1, T2 and/or based on a security policy that may be transmitted from the authentication server 10 with the first and/or second tokens T1, T2.

In some examples the authentication server 10 may be configured to issue the tokens T1, T2 to perform specific functions on the computing device 40. For example, the authentication server 10 may be configured to create at least one of the first token T1 and the second token T2 to control components (such as a camera, a microphone, a cell modem and a power controller of the computing device 40. This may include turning off and/or putting into a hibernate mode the computing device 40, components of the computing device 40, or even permanently disabling (for example by physically destroying, for example by burning) the memory of the computing device 40. In some examples the authentication server 10 may be configured to create at least one of the first token T1 and the second token T2 to perform this functionality based on instructions received from the user, for example via commands input via an application running on the mobile device 20.

In some examples it will be understood that the mobile device itself may create at least one of these tokens (such as the first token T1) to perform this functionality on the computing device without any communication with the authentication server. For example, a user of the mobile device 30 may wish to turn the computing device 40 off, and may enter a command to that effect in an application running on the mobile device 30. The mobile device 30 may then create and send a token to the computing device 40 (for example, over the first network 50, optionally via a beacon 30) without communicating with the authentication server 10.

In the example shown in FIG. 4, the first network interface 43 of the computing device 40 communicates via the first network 50, and then the second network interface 44 communicates via the second network 60. The processor 41 coupled to the first and second network interfaces makes a determination about whether to provide access to data in response to receiving the first token T1 via the first network 50, and the second token T2 via the second network 60. The determination about whether to provide access to data is based on a comparison of the first token T1 and the second token T2.

It will be understood from the discussion above that the computing device 40 of any of the examples described above may be configured to compare the two tokens T1, T2 to determine whether to provide access to data every time that a request for access to data is performed by a user of the computing device 40. Additionally and/or alternatively, in the computing device 40 may be configured to compare the two tokens T1, T2 to determine whether to provide access to data on a periodic basis, for example on a periodic basis as determined by a security policy, for example the security policy that may be transmitted from the authentication server 10 with the first and/or second tokens T1, T2. These approaches may help to ensure that only "fresh" tokens are used in controlling access to data.

An example of a security policy is shown in the table below. In this example, locations may be labelled as "Outside building", "Office area", "Meeting room" and "Control room". A beacon 30 may be labelled as "Public", "Secret", and "Top secret". Computing devices 40 may have a security permission level labelled as "Basic", "Standard" and "Premium". The security permission level may, for example, be defined based on the user credentials of a user logged in to the device, and/or may be predefined based on the hardware of the device.

TABLE 1

| An example of a security policy | | | | |
| --- | --- | --- | --- | --- |
| | | Computing device 40 | | |
| Location | Beacon 30 | Basic | Standard | Premium |
| Outside building | Public | x | x | x |
| Office area | Secret | ✓ | ✓ | ✓ |
| Meeting room | Secret | x | ☑ | ✓ |
| Control room | Top secret | x | x | ☑ |

The security policy dictates what components and/or data the computing device 40 should provide access to based on which beacon 30 the computing device 40 is in range of (in some examples it may be based on which beacon 30 is closest to the computing device 40, where the proximity to the beacon 30 may be determined, for example, by signal strength and/or time of flight measurements) and also based on the security permission level of the computing device 40 (i.e. "Basic", "Standard" or "Premium"). For example, when a computing device 40 with a "Standard" security permission level is located in an "Office area" and in communication range of a "Secret" beacon 30, the computing device 40, √ in the security policy indicates that the security policy dictates that the computing device 40 should provide access to all components of the computing device 40.

As another example, when a computing device 40 with a "Standard" security permission level is located in a "Meeting room" and in communication range of a "Secret" beacon 30, the computing device 40 "☑" in the security policy represents that the security policy dictates a computing device 40 should provide limited access to components and/or data, for example by allowing limited access to selected components such as a memory (for example by allowing the memory to be read, but not allowing anything to be recorded to memory) and not provide access to other components such as a microphone and/or camera coupled to the computing device 40. It will be understood in this example that the memory may be a non-transitory computer readable storage means, for example an external memory device such as a USB memory device.

For example, when a computing device 40 with a "Standard" security permission level is located in a "Control room" and in the communication range of a "Top secret"

beacon 30, "x" in the security policy represents that the security policy dictates that the computing device 40 should not provide access to any components coupled to the computing device 40.

FIG. 5 is a functional block diagram of another example computing device 40 for use with the system and method of any of FIGS. 1 to 3 and FIGS. 7 to 8. It will be understood that the computing device 40 may be a portable computing device, such as a laptop computer, a tablet or other handheld device such as a smartphone. The computing device 40 comprises a first network interface 43 and a second network interface 44, both coupled to a processor 41. The computing device 40 also comprises a camera 47, a microphone 45 and a memory 42. The computing device 40 also comprises LED lights 49 and an e-paper display 48.

In the example shown in FIG. 5, the first network interface 43 of the computing device 40 communicates via the first network 50, and then the second network interface 44 communicates via the second network 60. The processor 41 coupled to the first and second network interfaces is configured to make a determination about whether to provide access to components (such as the camera 47, the microphone 45 and the memory 42) associated with and/or coupled to the computing device 40 based on (a) a security policy and (b) beacon information received from beacon 30.

In the example shown, the security policy is received via the second network interface 44 and the beacon information (such as a beacon identifier) received via the first network interface 43.

In the example shown, the computing device 40 is configured to control access to the components via a physical means. In the example shown, the physical means comprises a physical switch (such as a field effect transistor, FET) for connecting or disconnecting the components from the processor 41. However it will be understood that in other examples the physical means may comprise a power control module which is configured to turn on/off the components by adjusting the current above or below threshold operating current of the components.

In the example shown, the accessibility of selected components (such as the memory 42, microphone 45 and camera 47) are optionally displayed on the computing device 40 and/or beacon 30, for example, via an indicator and/or display such as a LED light and/or an E-paper display. For example, in FIG. 5, indicators and/or displays such as LED lights 49 and an E-paper display 48 on the computing device 40 are configured to indicate the security policy and/or the accessibility/connection of memory 42 and/or other components such as the microphone 45/camera 47. For example, the e-paper display 48 may indicate the security policy, and the LED lights 49 may display the accessibility status (e.g. accessible or not).

Additionally and/or alternatively, indicators and/or displays such as an E-paper display 31 on the beacon 30 are configured to indicate the security policy and/or accessibility/connection of the components. In some examples, even when the computing device 40 is shut down or out of battery, indicators and/or displays such as an E-paper display 48 are configured to display the security policy with no power required.

FIG. 6 is a functional block diagram of another example computing device 40 for use with the system and method of any of FIGS. 1 to 3 and FIGS. 7 to 8.

In the example shown in FIG. 6, the computing device 40 comprises a processor 41 coupled to a memory 42, a first network interface 43 and a second network interface 44. The processor 41 is also coupled to an optional altitude sensor 600 and optional GPS module 602. The processor is also coupled to an optional user input 610 and display 612.

As shown in FIG. 6, the computing device 40 communicates with a beacon 30 over a first network 50 via the first network interface 43. It will be understood, however, that in other examples the computing device 40 may communicate with a plurality of beacons 30.

The optional altitude sensor 600 and/or a GPS module 602 provide location information such as altitude and/or GPS information for the computing device 40.

The first network 50 and/or the second network interface 44 are optionally configured to obtain local network information of the computing device 40, such as available network SSIDs and available beacons. User input 610 is configured to provide information such as the identity of a user of the computing device 40 and/or a password input by the user to access the computing device 40, and the display 612 is configured to display a user interface for the user. The computing device 40 is also configured to optionally communicate with an authentication server over a second network 60 via the second network interface 44. It will be understood that the second network may be a long-range radio frequency network and the first network a short-range radio frequency network.

The computing device 40 is configured to communicate with the beacon 30 and obtain a signal comprising information from the beacon 30, such as location information such as altitude and/or GPS information. In the example shown the beacon 30 is coupled to optional location sensors such as an altitude sensor 604 and/or a GPS module 606 to provide the altitude and/or GPS information for the beacon 30. It will be understood that the altitude sensor 604 and the GPS module 606 may be located inside the beacon 30.

The computing device 40 is configured to receive, via the first network interface 30, at least one signal from the at least one beacon 30. The computing device 40 is configured to make a determination about whether to provide access to the components based on (a) a security policy and (b) the received at least one signal from the at least one beacon 30. In some examples the computing device 40 may also be configured to make the determination based on location information indicating the location of the computing device 40, obtained for example via altitude sensor 600 and GPS module 602, in addition to or instead of location information indicating the location of the beacon 30 (however, it will be understood that in some examples the location of the computing device 40 may be inferred from the location of the beacon 30 as it may be inferred that the computing device 40 has to be in proximity to the beacon 30 if it is in communication with the beacon 30, particularly if the computing device 40 communicates with the beacon 30 over a short-range radio frequency network).

It will be understood that the signal received from the beacon 30 may comprise information indicative of the location of the beacon 30—this may be, for example inferred directly from the received information, or determined based on a look-up operation—for example, if the signal received from the beacon 30 contains a beacon identifier, the computing device 40 may be configured to perform a lookup operation to determine the location of the beacon 30 based on the beacon identifier. In some examples the computing device 40 may be configured to communication with the authentication server to perform this lookup operation, for example because only the authentication server knows the locations of each respective beacon and has a mapping between the locations of the beacons and the beacon identifiers.

It will also be understood that the security policy may be stored locally on the computing device 40, or received for example from an authentication server over the second network 60 via the second network interface 44. In some examples determining whether to provide access to components based on the security policy also comprises making a determination about whether to provide access to components based on the security permission level of the computing device 40. The security permission level may be based on user credentials, may be predetermined, may be based on hardware (e.g. an identifier such as a serial number of the computing device 40) and/or may be stored in memory 42.

FIG. 7a is another illustration of an example system for controlling the accessibility of data and/or components comprising a computing device 40, a beacon 30, an authentication server 10, a first network 50 between the computing device 40 and the beacon 30, and a second network 60 between the authentication server 10 and the computing device 40, and a third network 70 between the authentication server 10 and the beacon 30.

In practice, the computing device 40 and beacon 30 are configured to periodically send information to the authentication server 10. For example, the beacon 30 may be configured to send information relating to devices in range and/or connected to the beacon 30 to the authentication server 10 via the third network 70, and optionally the beacon may be configured to send location and/or device information relating to the beacon such as the altitude and GPS information of the beacon and/or the beacon identifier. The computing device 40 is configured to send location and/or device information relating to the computing device 40 via the second network 60. In some examples, the computing device 40 is also configured to send other information as well, such as information relating to the user of the computing device 40, a password input by the user and/or information relating to the beacon 30 that the computing device 40 is in communication with such as the beacon identifier.

In response to receiving information from the computing device 40 and beacon 30, the authentication server 10 may be configured to send a security policy to the computing device 40 via the second network 60. Optionally, the authentication server 10 may be configured to send the security policy to the beacon 30 via the third network 70, and the beacon 30 is configured to broadcast the security policy to the nearby computing device 40 over the first network 50 such as a Bluetooth® network. The computing device 40 may make a determination whether to provide access to components associated with and/or coupled to the computing device 40 based on the security policy received from the authentication server 10 via the first network 50 and/or the second network 60 and the location information of the computing device 40 and/or the beacon 30.

Additionally and/or alternatively, in response to receiving information such as beacon information from the computing device 40 and/or beacon 30, the authentication server 10 may be configured to also send a first token T1 to the beacon 30 over the third network 70. The beacon 30 may be configured to broadcast the first token T1 to the nearby computing device 40 over the first network 50 such as a Bluetooth® network. The computing device 40 may be configured to receive a second token T2 from the authentication server 10 over the second network 60. The computing device 40 may be configured to make a determination whether to provide access to the components based on the comparison of the first token T1 and the second token T2 as well as the security policy and location information.

In some examples, the computing device 40 may be configured to make a determination about whether to provide access to the components also based on information relating to the user of the computing device 40 and/or a unique identifier of the computing device 40.

In some examples, the computing device is configured to provide access to the components by way of a physical means, for example a switch such as an FET.

For example, the computing device 40 may have a "Standard" security permission level. When it is in an "Office area" and in the range of a "Secret" beacon 30, based on the security policy ("√" in Table 1), the authentication server 10 is configured to create two (optionally identical) tokens T1 and T2 in response to receiving information from the computing device 40 and beacon 30. The authentication server 10 is configured to send T1 with the security policy "√" to the computing device 40 via the second network 60 and send T2 with the security policy "√" to the beacon 30 via the first network 70. The security policy may dictate that the tokens T1, T2 only have a limited lifespan over which they are valid. The beacon 30 is configured to obtain the first token T1 from the authentication server 10 via the third network 70. Based on the security policy ("√"), the beacon 30 is configured to broadcast the first token T1 to the nearby computing device 40 over the first network 50 such as a Bluetooth® network. For example, the beacon 30 is configured to periodically and passively advertise and send tokens to the computing device 40 in the proximity to the beacon 30 without a secure connection. The computing device 40 is configured to receive the first token T1 over the first network 50 from the beacon 30. Based on the security policy and location information as well as a comparison of the first and second tokens T1 and T2, the computing device 40 is configured to provide access to components such as memory 42 but not provide access to components such as microphone 45 and camera 47.

When the computing device 40 moves to a "Control room" and in the range of a "Top secret" beacon 30', based on the security policy ("x" in Table 1), the authentication server 10 may create and send two new (again, optionally identical) tokens T1' and T2' to the computing device 40 and the beacon 30. The computing device 40 receives the two new tokens T1' and T2' and determines that it should not provide access to any components of the computing device 40 based on the two new tokens T1' and T2'.

FIG. 7b is a sequence diagram of an example method for use with the system of FIG. 7a. In the example shown, the computing device 40 and beacon 30 obtain 701 information (for example, the computing device 40 obtains beacon information and/or the beacon 30 obtains information relating to computing device 40 in its proximity and/or location information, such as altitude information and/or GPS information) and the computing device 40 and beacon 30 periodically send 701 this information to the authentication server 10 via the second network 60 and the third network 70 respectively. The authentication server 10 receives the information sent from the computing device 40 and the beacon 30 and sends 702 a security policy to the computing device 40 via the second network 60. The computing device 40 may make a determination 706 whether to provide access to the components based on the received security policy as well as the location information such as the location of the computing device 40 and/or beacon 30.

Alternatively and/or additionally, in response to receiving information, the authentication server 10 sends 703 a first token T1 to the beacon 30 over the third network 70 and sends 704 a second token T2 to the computing device 40 via the second network 60. The beacon 30 broadcasts 705 the first token T1 to the nearby computing device 40 over the first network 50 such as a Bluetooth® network. The computing device 40 makes a determination 706 whether to provide access to the components based on the comparison of the first token T1 and the second token T2 as well as the security policy and the location information.

FIG. 8*a* is another illustration of an example system for controlling the accessibility of data and/or components comprising a computing device, a beacon and an authentication server. In this example, the difference between FIG. 7*a* and FIG. 8*a* is that the authentication sever 10 is configured to first send a GSM message to wake up the computing device 40 at a location. The computing device 40 is configured to boot up in response to the GSM message and start to obtain the location and/or device information of the computing device 40 such as local network information and GPS information and send the information to the authentication server. A nearby beacon 30 is configured to obtain beacon information (such as the beacon identifier, the location of the beacon 30 and/or device information of the beacon 30) and periodically send the information to the authentication server 10. The beacon 30 is also configured to send information relating to the new computing device 40 in range and/or connected to the beacon 30 to the authentication server 10.

In some examples, when the computing device 40 wakes up at a location but no beacon 30 is nearby, the computing device 40 is configured to send a GSM message to the authentication server 10 providing an indication to the authentication server 10 that the computing device 40 is not in range of a beacon 30.

FIG. 8*b* is a sequence diagram of an example method for use with the system of FIG. 8*a*. In the example shown, the authentication server 10 sends 801 a "Wake up" GSM message to the computing device 40. The computing device 40 boots up and obtains 802 the location and/or device information of the computing device 40. For example, the computing device 40 may obtain the location and/or device information of a nearby beacon 30 as an indication of the location of the computing device 40, if the location of the beacon 30 is known (because the computing device 40 is necessarily in proximity to the beacon 30 if it is in communication with the beacon 30). The computing device 40 sends 803 the information to the authentication server 10. The nearby beacon 30 also optionally periodically sends 804 information to the authentication server 10, for example including information indicating computing devices 40 in range of and/or communicating with the beacon 30, and or information relating to the beacon 30 such as altitude and/or GPS information.

The authentication server 10 receives the information sent by the computing device 40 and optionally from the beacon 30 and, in response to receiving this information, the authentication server 10 makes a determination 805 about whether to provide access to components of the computing device 40 and/or data, and sends 806 a first token T1 to the beacon 30 over the third network 70 and sends 807 a second token T2 to the computing device 40 via the second network 60 based on this determination. The beacon 30 broadcasts 808 the first token T1 to the nearby computing device 40 over the first network 50 such as a Bluetooth® network. The computing device 40 makes a determination 809 whether to provide access to components associated with and/or coupled to the computing device 40, and/or access to data, based on the comparison of the first token T1 and the second token T2.

In some examples, the computing device 40 may make a determination about whether to provide access to the components also based on information relating to the user of the computing device 40 and/or a unique identifier of the computing device 40, as well as optionally a security policy.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A computing device for controlling the accessibility of selected components coupled to the computing device, the computing device comprising:

a network interface configured to communicate with at least one beacon in proximity to the computing device; and wherein the computing device is configured to receive, via the network interface, at least one signal from the at least one beacon, and wherein the computing device is configured to make a determination about whether to provide access to the components based on (a) a security policy received from an authentication server or held locally on the computing device, wherein the security policy determines permissions of users of the computing device;

(b) the received at least one signal from the at least one beacon; and (c) information relating to a user of the computing device;

wherein the at least one signal from the at least one beacon comprises information indicative of a location of the at least one beacon and wherein the security policy defines the accessibility of selected components based at least on the information indicative of the location of the at least one beacon.

2. The computing device of claim 1, wherein the computing device comprises a first network interface for communicating over a first network and a second network interface for communicating over a second network, and wherein the computing device is configured to receive the at least one signal from the at least one beacon via the first network interface, and the security policy from the second network interface.

3. The computing device of claim 1, wherein the computing device is configured to make a determination about whether to provide access to the selected components also based on information relating to the user of the computing device and/or a unique identifier of the computing device, and wherein the security policy defines the accessibility of selected components based also on a unique identifier of the computing device.

4. The computing device of claim 1, wherein providing access to the selected components is controlled via a physical means, wherein the physical means comprises at least one of (i) a physical switch and (ii) a power control module.

5. The computing device of claim 1, wherein providing access to the selected components comprises providing access to at least one of memory, audio sensors and imaging sensors coupled to the computing device.

6. A method for controlling the accessibility of selected components coupled to a computing device, the method comprising:

obtaining beacon information from at least one beacon in proximity to the computing device; and determining whether to provide access to the selected components based on (a) a security policy received from an authentication server or held locally on the computing device, wherein the security policy determines permissions of users of the computing device;

(b) the beacon information; and (c) information relating to a user of the computing device;

wherein the beacon information comprises information indicative of a location of the at least one beacon and wherein the security policy defines the accessibility of selected components based at least on the information indicative of the location of the at least one beacon.

7. The method of claim 6, wherein the method comprises receiving the at least one signal from the at least one beacon via a first network, and receiving the security policy from a second network.

8. The method of claim 6, wherein the method comprises making a determination about whether to provide access to the selected components also based on a unique identifier of the computing device.

9. The method of claim 6, wherein the security policy defines the accessibility of selected components based also on the information relating to the user of the computing device and/or a unique identifier of the computing device.

10. The method of claim 6, wherein providing access to the selected components is controlled via a physical means, wherein the physical means comprises at least one of (i) a physical switch and (ii) a power control module.

11. The method of claim 6, wherein providing access to the selected components comprises providing access to at least one of memory, audio sensors and imaging sensors coupled to the computing device.

12. An authentication server for controlling the accessibility of selected components coupled to a computing device, wherein the authentication server is configured to obtain beacon information based on at least one beacon in proximity to the computing device; and determine the accessibility of components based on the beacon information and a security policy;

wherein the authentication server is configured to determine location information from the obtained beacon information;

wherein the security policy defines the accessibility of selected components based at least on the information indicative of the location of the at least one beacon.

13. The authentication server of claim 12, wherein the authentication server is configured to make a determination about whether to provide access to the selected components also based on information relating to the user of the computing device and/or a unique identifier of the computing device.

14. The authentication server of claim 12, wherein the security policy defines the accessibility of selected components based at least on the information indicative of the location of the at least one beacon, wherein the authentication server is configured to make a determination about whether to provide access to the selected components also based on information relating to the user of the computing device and/or a unique identifier of the computing device and wherein the security policy defines the accessibility of selected components based also on the information relating to the user of the computing device and/or a unique identifier of the computing device.

15. The authentication server of claim 12, wherein the authentication server is configured to provide access to the selected components by triggering the sending of a first token to the computing device via a first network, and a second token to the computing device via a second network, wherein the authentication server is configured to send the second token to the computing device via a second network and via the at least one beacon.

16. The authentication server of claim 12, wherein providing access to the selected components comprises providing access to at least one of memory, audio sensors and imaging sensors coupled to the computing device.

* * * * *